US012455614B2

(12) United States Patent
Nemani et al.

(10) Patent No.: US 12,455,614 B2
(45) Date of Patent: Oct. 28, 2025

(54) POWER LIMITING IN A PROCESSOR-BASED SYSTEM BASED ON ALLOCATING POWER BUDGETS FOR DIFFERENT SUB-SYSTEMS BASED ON MULTIPLE TIME-BASED POWER LIMITS

(71) Applicant: QUALCOMM Incorporated, San Diego, CA (US)

(72) Inventors: Mahadevamurty Nemani, San Diego, CA (US); Matthew Severson, Austin, TX (US); Gabriel Watkins, San Diego, CA (US); Vijayakumar Ashok Dibbad, Bangalore (IN); Ronald Alton, Oceanside, CA (US); Lai Xu, San Diego, CA (US); Jeffrey Gemar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 18/475,371

(22) Filed: Sep. 27, 2023

(65) Prior Publication Data

US 2025/0103130 A1 Mar. 27, 2025

(51) Int. Cl.
*G06F 1/26* (2006.01)
*G06F 1/32* (2019.01)
(Continued)

(52) U.S. Cl.
CPC .......... *G06F 1/3296* (2013.01); *G06F 1/3206* (2013.01)

(58) Field of Classification Search
CPC ............................ G06F 1/3296; G06F 1/3206
See application file for complete search history.

(56) References Cited

U.S. PATENT DOCUMENTS 8,775,833 B2 7/2014 Ananthakrishnan et al.
8,898,494 B2 11/2014 Schluessler et al.
(Continued)

OTHER PUBLICATIONS

ADI, "MAX34407," available as early as May 2023 from the Internet: [URL: https://www.analog.com/en/products/max34407. html], 5 pages.
(Continued)

*Primary Examiner* — Mohammed H Rehman
(74) *Attorney, Agent, or Firm* — W&T

(57) ABSTRACT

Power limiting in a processor-based system based on allocating power budgets for different sub-systems based on multiple time-based power limits is disclosed. The processor-based system has multiple power consuming sub-systems (e.g., non-processing unit (PU) and PU sub-systems) that demand and consume power from a power source of the processor-based system. To limit overall power consumption of the processor-based system over different time-based power limits, the processor-based system includes a power limiter circuit. The power limiter circuit is configured to manage multiple, different time-based (e.g., time constant) power limits for the processor-based system and to allocate corresponding power limit budgets to constrain power consumption of different sub-systems based on the multiple time-based power limits. The power limiter circuit can be configured to constrain power consumption of a PU sub-system to a total PU sub-system power limit budget based on the multiple time-based power limits.

35 Claims, 12 Drawing Sheets

(51) Int. Cl.
*G06F 1/3206* (2019.01)
*G06F 1/3296* (2019.01)

(56) References Cited

U.S. PATENT DOCUMENTS

| | | | | |
|---|---|---|---|---|
| 10,228,746 | B1* | 3/2019 | Ram | G06F 1/26 |
| 10,712,806 | B1* | 7/2020 | Park | G06F 1/28 |
| 11,681,353 | B1 | 6/2023 | Bower, III et al. | |
| 2016/0070327 | A1* | 3/2016 | Nemani | G06F 1/3206 |
| | | | | 713/300 |
| 2017/0123482 | A1 | 5/2017 | Berke et al. | |
| 2017/0329383 | A1 | 11/2017 | Bailey et al. | |
| 2020/0042068 | A1 | 2/2020 | Rong et al. | |
| 2020/0107261 | A1* | 4/2020 | Boodannavar | H04W 88/08 |
| 2023/0121562 | A1* | 4/2023 | Maddukuri | G06F 9/50 |
| | | | | 718/104 |
| 2023/0123999 | A1* | 4/2023 | Ballard | G06F 13/4027 |
| | | | | 713/1 |
| 2023/0141475 | A1 | 5/2023 | Li et al. | |
| 2023/0205592 | A1* | 6/2023 | Ould-Ahmed-Vall | |
| | | | | G06F 9/4881 |
| | | | | 718/104 |
| 2024/0329711 | A1* | 10/2024 | Begum | G06F 1/3215 |
| 2025/0085765 | A1* | 3/2025 | Nge | G01R 31/387 |

OTHER PUBLICATIONS

ADI, "MAX34417," available as early as May 2023 from the Internet: [URL: https://www.analog.com/en/products/max34417.html#product-overview], 6 pages.

AMD, "AMD µProf," 2022, available on the Internet: [URL: https://www.amd.com/en/developer/uprof.html], 10 pages.

Intel, "12th Generation Intel® Core™ Processors Datasheet," vol. 1 of 2, Rev. 010, Feb. 2023, available from the Internet: [URL: https://edc.intel.com/content/www/us/en/design/ipla/software-development-platforms/client/platforms/alder-lake-desktop/12th-generation-intel-core-processors-datasheet-volume-1-of-2/001/telemetry-aggregator/], 208 pages.

Mckay, T. et al., "Intel® Power Gadget," May 2019, available from the Internet: [URL: https://www.intel.com/content/www/us/en/developer/articles/tool/power-gadget.html], 3 pages.

Microchip, "PAC1934," available as early as May 2023 from the Internet: [URL: https://www.microchip.com/en-us/product/PAC1934], 8 pages.

Microchip, "PAC1944," available as early as May 2023 from the Internet: [URL: https://www.microchip.com/en-us/product/PAC1944], 8 pages.

Microchip, "PAC1954," available as early as May 2023 from the Internet: [URL: https://www.microchip.com/en-us/product/PAC1954], 7 pages.

Singh, R., "Apple Silicon M1 Power Consumption Deep Dive Part 1: Safari vs Chrome," Apr. 2, 2021, retrieved from the Internet: [URL: https://singhkays.com/blog/apple-silicon-m1-video-power-consumption-pt-1/], 15 pages.

International Search Report and Written Opinion for International Patent Application No. PCT/US2024/042137, mailed Nov. 26, 2024, 14 pages.

* cited by examiner

POWER LIMITING IN A PROCESSOR-BASED SYSTEM BASED ON ALLOCATING POWER BUDGETS FOR DIFFERENT SUB-SYSTEMS BASED ON MULTIPLE TIME-BASED POWER LIMITS

BACKGROUND

I. Field of the Disclosure

The field of the disclosure relates to a processor-based system, such as a system-on-a-chip (SoC), that includes one or more processing units (e.g., a central processing unit(s) (CPU(s)), a graphic processing unit(s) (GPU(s)), and/or or a neural processing unit(s) (NPU(s))), and more particularly to power distribution to the processing units in the processor-based system.

II. Background

Processor-based systems conventionally include a power management system that controls the supply of power to power rails supplying power to circuits for their operation. A processor-based system may also include multiple power rails each with an individually settable voltage level so that different voltage levels can be supplied in the system. Some circuits may require lower voltage levels than other circuits for operation. Further, it may be desired to provide circuits whose power can be collapsed during idle times (e.g., a processor) on a different power rail or domain than other circuits that have a minimum voltage level (e.g., memory circuits). Further, a processor-based system may include a frequency and voltage scaling system that is configured to dynamically change or scale the frequency of clocked circuits and/or their voltage level for operation. A higher frequency results in a faster operation of a clocked circuit. However, a higher voltage level may be required to support operation at a higher frequency. Further, higher frequency and voltage operation results in increased power consumption. Other devices in the processor-based system may not need to be scaled in performance.

A system-on-a-chip (SoC) can be provided in a processor-based system, wherein the SoC includes one or more processors and supporting circuitry, such as memory and power management circuits. The SoC is a single semiconductor die that can include multiple processors and different types of processors to perform different types of operations efficiently (e.g., a central processing unit(s) (CPU(s)), a graphic processing unit(s) (GPU(s)), and/or or a neural processing unit(s) (NPU(s))). The SoC may be integrated into a processor-based device that is a mobile device that uses a battery as a power source. As the processor(s) in the SoC executes workloads at higher performance levels, the power demand of the processor(s) and other supporting circuitry may exceed the available power from the battery in the processor-based system. The need for increased power demand may be exacerbated in more complex SoCs that include multiple processors that may be executing workloads concurrently. The battery may have multiple time-based power limit specifications for both shorter duration power consumption limits/restrictions (e.g., burst power limitations over millisecond(s) windows) and longer duration power consumption limits/restrictions (e.g., over second(s) windows) that need to be managed in the processor-based device.

Also, heat is generated by the processor(s) and circuits in the SoC as a result of energy losses from the powered operation of the circuits. A SoC and/or its processor-based device may have a thermal, temperature limitation for operation. This thermal limit may be based on circuit performance criteria (e.g., a circuit will have a thermal limit at which performance starts to decrease), to extend battery life, and/or to maintain temperature within "skin limits." For example, a processor-based device that includes the SoC may be a wearable device or other device (e.g., a laptop computer) that is expected or designed to come into contact with a user's skin. The ambient temperature also affects the temperature of the processor-based device. The thermal and/or skin temperature limits may also have multiple time-based power limit specifications for both various shorter duration and longer duration power consumption limits/restrictions.

SUMMARY OF THE DISCLOSURE

Aspects disclosed herein include power limiting in a processor-based system based on allocating power budgets for different sub-systems based on multiple time-based power limits. The processor-based system has multiple power consuming sub-systems that each contain circuitry that demand and consume power from a power source of the processor-based system based on their operation. For example, the processor-based system can include a processing unit (PU) sub-system that includes one or more PUs that each demand and consume power based on executed workloads that can vary over time. As an example, the PU sub-system with its one or more PUs as well as non-PU devices (e.g., memory) may be contained along within a system-on-a-chip (SoC). The processor-based system may also have other non-PU power consuming sub-systems, such as memory, that require power to store and provide read access to data and to maintain such data persistently, and power management circuits for delivering power and controlling temperature of the processor-based system. The processor-based system may have power limits based on sub-system performance limits, thermal limits, and/or skin temperature limits such that the overall power consumption in the processor-based system needs to be limited, but in a manner that optimizes the performance of the sub-systems in the processor-based system. Further, these power limits may have different time constants over which power consumption is limited, such as over milliseconds (ms) to seconds(s). Thus, it may be necessary to limit the power consumption differently over different time constants or windows that are based on multiple time-based power limits prescribed for the processor-based system. Otherwise, for example, power consumption of the processor-based system could still be within a desired limit over a longer duration of time, but in violation of shorter duration power limits, which may still negatively affect processor and/or battery performance.

In this regard, in exemplary aspects disclosed herein, to limit overall power consumption of the processor-based system over different time-based power limits while attempting to still achieve an optimized performance of the PU subsystem, the processor-based system includes a power limiter circuit. The power limiter circuit is configured to manage multiple, different time-based (e.g., time constant) power limits for the processor-based system and to allocate corresponding power limit budgets to constrain power consumption of the different sub-systems based on the multiple time-based power limits. For example, the processor-based system may have multiple, different time-based power limits for different time constants, such as a burst power limit(s) over a shorter duration of time (e.g., milliseconds), and an average power consumption over a longer duration of time (e.g., seconds). In this regard, the power limiter circuit is configured to compare multiple time-based power limits specified for the processor-based system to a current power consumption of multiple sub-systems in the processor-based system to generate respective power limit budgets for constraining power consumption of the sub-systems.

In an example, the time-based power limits that are compared to the current power consumption to generate the respective power limit budgets are each time-scaled to a common (e.g., shortest) duration time window of the most time-constrained power limit. This is so that the power limiter circuit can compare each of the generated power limit budgets based on the different time-based power limits on a common time window to then constrain power consumption based on the determined most limited power limit budget. In this manner, the time-based power limit that generates the most power constrained power limit budget can be used to limit power consumption in the processor-based system to avoid or reduce the possibility of violating any of the multiple time-based power limits.

In this manner, the power limit budget for the processor-based system can be optimized to constrain power consumption in the processor-based system on a dynamic and continuous basis based on multiple time-based power limits for the processor-based system. Thus, the performance of the processor-based system can be optimized in real time over multiple time-based power limits while remaining within the thermal limit and/or the skin temperature limit of the processor-based system. Limiting power consumption in the processor-based system can also achieve a desired overall workload performance for the PU sub-system in a sustainable manner since heat and temperature can degrade workload performance. Limiting power consumption in the processor-based system can also extend battery life as temperature can negatively affect battery performance and power supplying capacity.

In an example, the power limiter circuit can be configured to track current power consumption in the common time window exceeding or not exceeding a respective time-based power limit. Current power consumption below its respective time-based power limit in the common time window can be used as a power credit to offset power debits from current power consumption exceeding its respective time-based power limit in the common time window. Thus, the power limit budget corresponding to the time-based power limit can be generated as a function of the overall, average power consumption over the common time window to avoid unnecessarily having to limit the power limit budget based on the highest instantaneous power consumption within the time window. This is possible, because the time-based power limits for the processor-based system will not have a shorter duration than the common time window.

In another example, the power limiter circuit can be configured to continuously generate updated, new power limit budgets based on updated, current power consumptions compared to multiple time-based power limits. In this manner, if there is excess power budget available, the power limiter circuit can increase a corresponding power limit budget. If there is not excess power budget available, the power limiter circuit can reduce a corresponding power limit budget.

In another example, because it may be important to optimize power consumption of the PU sub-system to optimize its performance based on its varying workloads, the processor-based system may be configured to have separate time-based power limits for the PU sub-system. In this regard, the processor-based system can have PU sub-system time-based power limits for the PU sub-system, and system-level time-based power limits for the overall processor-based system. In this example, the power limiter circuit can be configured to generate multiple system-level power limit budgets for the overall processor-based system based on a comparison of respective time-scaled current power consumption in the processor-based system to multiple system-level time-based power limits for the processor-based system. Also, in this example, the power limiter circuit can be configured to generate multiple PU sub-system time-based power limit budgets for the PU sub-system based on respective multiple PU sub-system time-based power limits for the PU sub-system. The power limiter circuit could be configured to generate one or more of the PU sub-system time-based power limit budgets based on a comparison of a respective time-scaled current power consumption(s) of a non-PU device (e.g., a memory system) in the PU subsystem to a respective PU sub-system time-based power limit. In this manner, this PU sub-system time-based power limit budget(s) would be based on a remaining power budget available after taking into consideration the non-PU device power consumption in the PU sub-system. The power limiter circuit can then be configured to generate respective, additional PU sub-system power limit budgets for the PU sub-system based on each of the respective system-level time-based power limits based on the remaining available budget from the respective system-level power limit budgets.

In this manner, each of the PU sub-system time-based power limits and system-level time-based power limits can be used to generate respective, corresponding PU sub-system power limit budgets. These PU sub-system power limit budgets are based on each of the PU and system-level time-based power limits for constraining its power consumption. In an example, the power limiter circuit can then use the most constrained PU sub-system power limit budget for each of the respective, corresponding PU sub-system power limit budgets to provide a total PU sub-system power limit budget to the PU sub-system to constrain the overall power consumption of the PU sub-system. In this manner, the generated total PU sub-system power limit budget to constrain power consumption of the PU sub-system can be optimized to the available amount of power limit budget remaining from the overall processor-based system on a dynamic and continuous basis based on multiple time-based power limits for the processor-based system. Thus, the performance of the PU sub-system can be optimized in real time over multiple time-based power limits while remaining within the thermal limit and/or the skin temperature limit of the processor-based system. Limiting power consumption in the processor-based system can also achieve a desired overall workload performance for the PU sub-system in a sustainable manner since heat and temperature can degrade workload performance. Limiting power consumption in the processor-based system can also extend battery life as temperature can negatively affect battery performance and power supplying capacity.

In other exemplary aspects, the PU sub-system includes multiple PUs that perform workloads and thus consume power. These multiple PUs can include, as examples, a central PU (CPU), a graphics PU (GPU), and/or a neural signal processor (NSP). In exemplary aspects, to optimize the performance of the multiple PUs in the PU sub-system, the power limiter circuit can be configured to allocate the determined total PU sub-system power limit budget to the different PUs in the PU sub-system to optimize their individual performances. For example, the power limiter circuit could be configured to allocate different PU power limit budgets from the total PU sub-system power limit budget for each of the different PUs based on the respective workloads being executed by the PUs. In this manner, as an example, if a workload executed in a first PU consumes more power for performance than a workload executed in another, second PU at a particular time, the power limiter circuit can be configured to allocate a larger PU power limit budget from the total PU sub-system power limit budget to the first PU than the second PU. In this manner, the total PU sub-system power limit budget can be allocated to the different PUs in the PU sub-system based on their relative power demands based on executed workloads to try to achieve optimal performance while keeping the overall PU sub-system power consumption within the total PU sub-system power limit budget to limit the overall power consumption for the processor-based system.

In this regard, in one exemplary aspect, a power limiter circuit for limiting power consumption in a processor-based system comprising a processing unit (PU) sub-system comprising one or more PUs is provided. The power limiter circuit is configured to compare a PU sub-system current power consumption indicating a first current power consumption in the PU sub-system to each of one or more PU sub-system time-based power limits. The power limiter circuit is also configured compare a system current power consumption indicating a second current power consumption in the processor-based system to each of one or more system time-based power limits. The power limiter circuit is also configured generate one or more first PU sub-system power limit budgets based on the comparison of the PU sub-system current power consumption in the PU sub-system, to respective one or more PU sub-system time-based power limits. The power limiter circuit is also configured generate one or more second PU sub-system power limit budgets based on the comparison of the system current power consumption in the processor-based system, to respective one or more system time-based power limits. The power limiter circuit is also configured generate a total PU sub-system power limit budget based on a lower power limit budget among the one or more first PU sub-system power limit budgets and the one or more second PU sub-system power limit budgets. The power limiter circuit is also configured to cause a power consumption in the PU sub-system to be constrained to the total PU sub-subsystem power limit budget.

In another exemplary aspect, a method of limiting power consumption in a processor-based system comprising a PU sub-system comprising one or more PUs. The method comprises comparing a PU sub-system current power consumption indicating a first current power consumption in the PU sub-system to each of one or more PU sub-system time-based power limits. The method also comprises comparing a system current power consumption indicating a second current power consumption in the processor-based system to each of one or more system time-based power limits. The method also comprises generating one or more first PU sub-system power limit budgets based on the comparison of the PU sub-system current power consumption in the PU sub-system, to respective one or more PU sub-system time-based power limits. The method also comprises generating one or more second PU sub-system power limit budgets based on the comparison of the system current power consumption in the processor-based system, to respective one or more system time-based power limits. The method also comprises generating a total PU sub-system power limit budget based on a lower power limit budget among the one or more first PU sub-system power limit budgets and the one or more second PU sub-system power limit budgets. The method also comprises causing a power consumption in the PU sub-system to be constrained to the total PU sub-subsystem power limit budget.

In another exemplary aspect, a processor-based system is provided. The processor-based system comprises a PU sub-system comprising one or more PUs. The processor-based system also comprises a non-PU sub-system comprising one or more non-PU devices. The processor-based system also comprises a PU sub-system power monitoring circuit configured to monitor PU sub-system current power consumption in the PU sub-system. The processor-based system also comprises a system power monitoring circuit configured to monitor system current power consumption in the processor-based system. The processor-based system also comprises a PU power constraining circuit configured to constrain the PU sub-system current power consumption in the PU sub-system. The processor-based system also comprises a power limiter circuit. The power limiter circuit is configured to compare a PU sub-system current power consumption indicating a first current power consumption in the PU sub-system to each of one or more PU sub-system time-based power limits. The power limiter circuit is also configured compare a system current power consumption indicating a second current power consumption in the processor-based system to each of one or more system time-based power limits. The power limiter circuit is also configured generate one or more first PU sub-system power limit budgets based on the comparison of the PU sub-system current power consumption in the PU sub-system, to respective one or more PU sub-system time-based power limits. The power limiter circuit is also configured generate one or more second PU sub-system power limit budgets based on the comparison of the system current power consumption in the processor-based system, to respective one or more system time-based power limits. The power limiter circuit is also configured generate a total PU sub-system power limit budget based on a lower power limit budget among the one or more first PU sub-system power limit budgets and the one or more second PU sub-system power limit budgets. The power limiter circuit is also configured to cause a power consumption in the PU sub-system to be constrained to the total PU sub-subsystem power limit budget.

DETAILED DESCRIPTION

Figure 1:
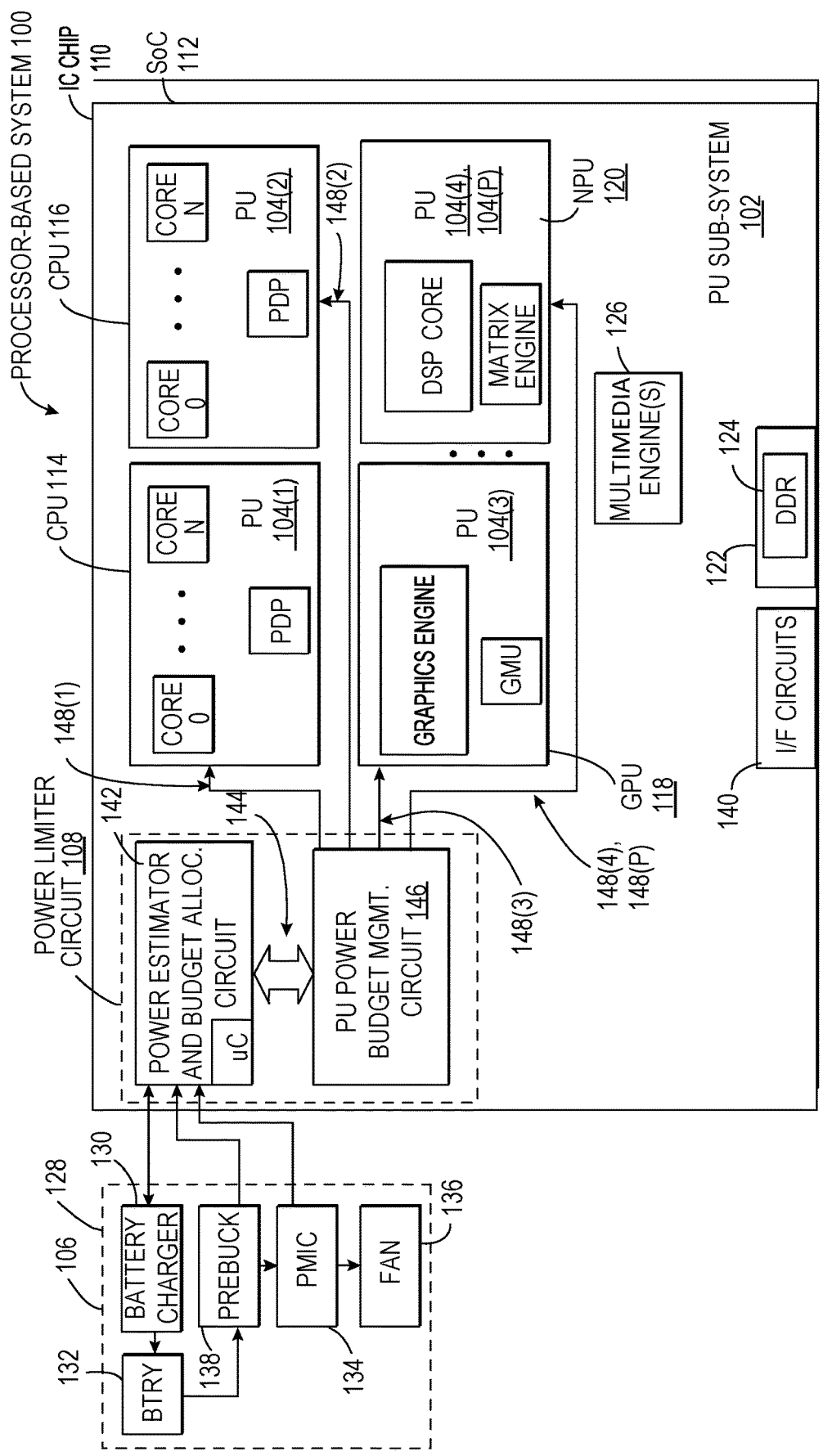
FIG. 1 is a block diagram of an exemplary processor-based system that includes a processing unit (PU) sub-system with multiple PUs, non-PU devices, and a power limiter circuit configured to allocate a total PU power limit budget to the PU sub-system to constrain its power consumption based on multiple time-based power limits for the processor-based system.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include power limiting in a processor-based system based on allocating power budgets for different sub-systems based on multiple time-based power limits. The processor-based system has multiple power consuming sub-systems that each contain circuitry that demand and consume power from a power source of the processor-based system based on their operation. For example, the processor-based system can include a processing unit (PU) sub-system that includes one or more PUs that each demand and consume power based on executed workloads that can vary over time. As an example, the PU sub-system with its one or more PUs as well as non-PU devices (e.g., memory) may be contained along within a system-on-a-chip (SoC). The processor-based system may also have other non-PU power consuming sub-systems, such as memory, that require power to store and provide read access to data and to maintain such data persistently, and power management circuits for delivering power and controlling temperature of the processor-based system. The processor-based system may have power limits based on sub-system performance limits, thermal limits, and/or skin temperature limits such that the overall power consumption in the processor-based system needs to be limited, but in a manner that optimizes the performance of the sub-systems in the processor-based system. Further, these power limits may have different time constants over which power consumption is limited, such as over milliseconds (ms) to seconds(s). Thus, it may be necessary to limit the power consumption differently over different time constants or windows that are based on multiple time-based power limits prescribed for the processor-based system. Otherwise, for example, power consumption of the processor-based system could still be within a desired limit over a longer duration of time, but in violation of shorter duration power limits, which may still negatively affect processor and/or battery performance.

In this regard, in exemplary aspects disclosed herein, to limit overall power consumption of the processor-based system over different time-based power limits while attempting to still achieve an optimized performance of the PU subsystem, the processor-based system includes a power limiter circuit. The power limiter circuit is configured to manage multiple, different time-based (e.g., time constant) power limits for the processor-based system and to allocate corresponding power limit budgets to constrain power consumption of the different sub-systems based on the multiple time-based power limits. For example, the processor-based system may have multiple, different time-based power limits for different time constants, such as a burst power limit(s) over a shorter duration of time (e.g., milliseconds), and an average power consumption over a longer duration of time (e.g., seconds). In this regard, the power limiter circuit is configured to compare multiple time-based power limits specified for the processor-based system to a current power consumption of multiple sub-systems in the processor-based system to generate respective power limit budgets for constraining power consumption of the sub-systems.

In an example, the time-based power limits that are compared to the current power consumption to generate the respective power limit budgets are each time-scaled to a common (e.g., shortest) duration time window of the most time-constrained power limit. This is so that the power limiter circuit can compare each of the generated power limit budgets based on the different time-based power limits on a common time window to then constrain power consumption based on the determined most limited power limit budget. In this manner, the time-based power limit that generates the most power constrained power limit budget can be used to limit power consumption in the processor-based system to avoid or reduce the possibility of violating any of the multiple time-based power limits.

In this manner, the power limit budget for the processor-based system can be optimized to constrain power consumption in the processor-based system on a dynamic and continuous basis based on multiple time-based power limits for the processor-based system. Thus, the performance of the processor-based system can be optimized in real time over multiple time-based power limits while remaining within the thermal limit and/or the skin temperature limit of the processor-based system. Limiting power consumption in the processor-based system can also achieve a desired overall workload performance for the PU sub-system in a sustainable manner since heat and temperature can degrade workload performance. Limiting power consumption in the processor-based system can also extend battery life as temperature can negatively affect battery performance and power supplying capacity.

In this regard, FIG. 1 is a block diagram of an exemplary processor-based system 100 that includes a processing unit (PU) sub-system 102 with multiple PUs 104(1)-104(P), non-PU devices 106, and a power limiter circuit 108. As discussed in more detail below, the power limiter circuit 108 is configured to constrain and limit the overall power consumption of the processor-based system 100 and its PU sub-system 102 over different time-based power limits while attempting to still achieve an optimized performance of the PU sub-system 102. Before discussing the exemplary aspects of the power limiter circuit 108 limiting the overall power consumption of the processor-based system 100 and its PU sub-system 102 over different time-based power limits, the exemplary elements and circuits in the processor-based system 100 are first described now.

In this regard, with reference to FIG. 1, the processor-based system 100 includes an integrated circuit (IC) chip 110 in this example, which is a system-on-a-chip (SoC) 112 in this example. The SoC 112 in this example includes four (4) PUs 104(1)-104(4), which in this example are a first central PU (CPU) 114, a second CPU 116, a graphics PU (GPU) 118, and a neural PU (NPU) 120. The PUs 104(1)-104(4) are each configured to execute instructions to perform respective workloads. Thus, the PUs 104(1)-104(4) consume power to operate. In this example, the SoC 112 includes a shared memory system 122 that can be accessed by each of the PUs 104(1)-104(4) for storage and retrieval of data for executing instructions. The shared memory system 122 may be a cache memory, such as a last-level cache memory, as examples. The shared memory system 122 in this example has a shared memory 124 (e.g., a double-data rate (DDR) memory) that is generally accessible by each of the PUs 104(1)-104(4). The shared memory system 122 may also have a memory management unit (MMU) configured to manage access to the shared memory 124. The shared memory system 122 may also have statically configured memory regions, for the respective PUs 104(1)-104(4) and a multi-media system 126 also included in the SoC 112.

With continuing reference to FIG. 1, the processor-based system 100 also includes other devices outside of the SoC 112 and its PUs 104(1)-104(4) that provide supporting functions including the supply of power to the SoC 112 and its PUs 104(1)-104(4) for operation. These other devices are non-PU power consuming devices 128 that are outside the SoC 112 and its PUs 104(1)-104(4) and are also electrical devices that are also power consuming in their own right. In this example, the processor-based system 100 includes a battery charging circuit 130 that is a circuit configured to charge a battery 132. The battery 132 is provided to supply power to the processor-based system 100 if the processor-based system 100 is not connected to a fixed power source. In this manner, the processor-based system 100 is configured to operate off of battery power as a power cordless device, such as in a mobile device. As also shown in FIG. 1, the processor-based system 100 includes a power management IC (PMIC) 134 that is configured to manage the supply of power to the SoC 112 and other components of the processor-based system 100, such as a fan 136 for cooling. The PMIC 134 manages the battery charging circuit 130 to charge the battery 132 when the processor-based system 100 is connected to a power source. The PMIC 134 manages the discharge of the battery 132 to provide power when the processor-based system 100 is not connected to a power source. The processor-based system 100 in this example also includes a pre-buck power circuit 138 that is configured to supply power to the SoC 112 for peak current demands.

The PUs 104(1)-104(P) in the processor-based system 100 each demand and consume power based on their executed workloads, which can also vary over time. As an example, the PU sub-system 102 with its PUs 104(1)-104(P) as well as non-PU devices such as interface circuits 140 may be contained within the SoC 112. The processor-based system 100 may also have other non-PU power consuming sub-systems, such as the shared memory system 122, that require power to store and provide read access to data and to maintain such data persistently. The processor-based system 100 may also have non-PU power management circuits (e.g., the battery charging circuit 130, the battery 132, the PMIC 134, the fan 136, and the pre-buck power circuit 138) for delivering power and controlling temperature of the processor-based system 100. The processor-based system 100 may have power limits based on PU sub-system 102 performance limits, thermal limits, and/or skin temperature limits such that the overall power consumption in the processor-based system 100 needs to be limited, but in a manner that optimizes the performance of the PU sub-system 102 in the processor-based system 100. Further, these power limits may have different time constants over which power consumption is limited, such as over milliseconds (ms) to seconds(s). Thus, it may be necessary to limit the power consumption differently over different time constants or windows that are based on multiple time-based power limits prescribed for the processor-based system 100 and/or its PU sub-system 102. Otherwise, for example, power consumption of the processor-based system 100 could still be within a desired limit over a longer duration of time, but in violation of shorter duration power limits, which may still negatively affect processor and/or battery performance.

Figure 2:
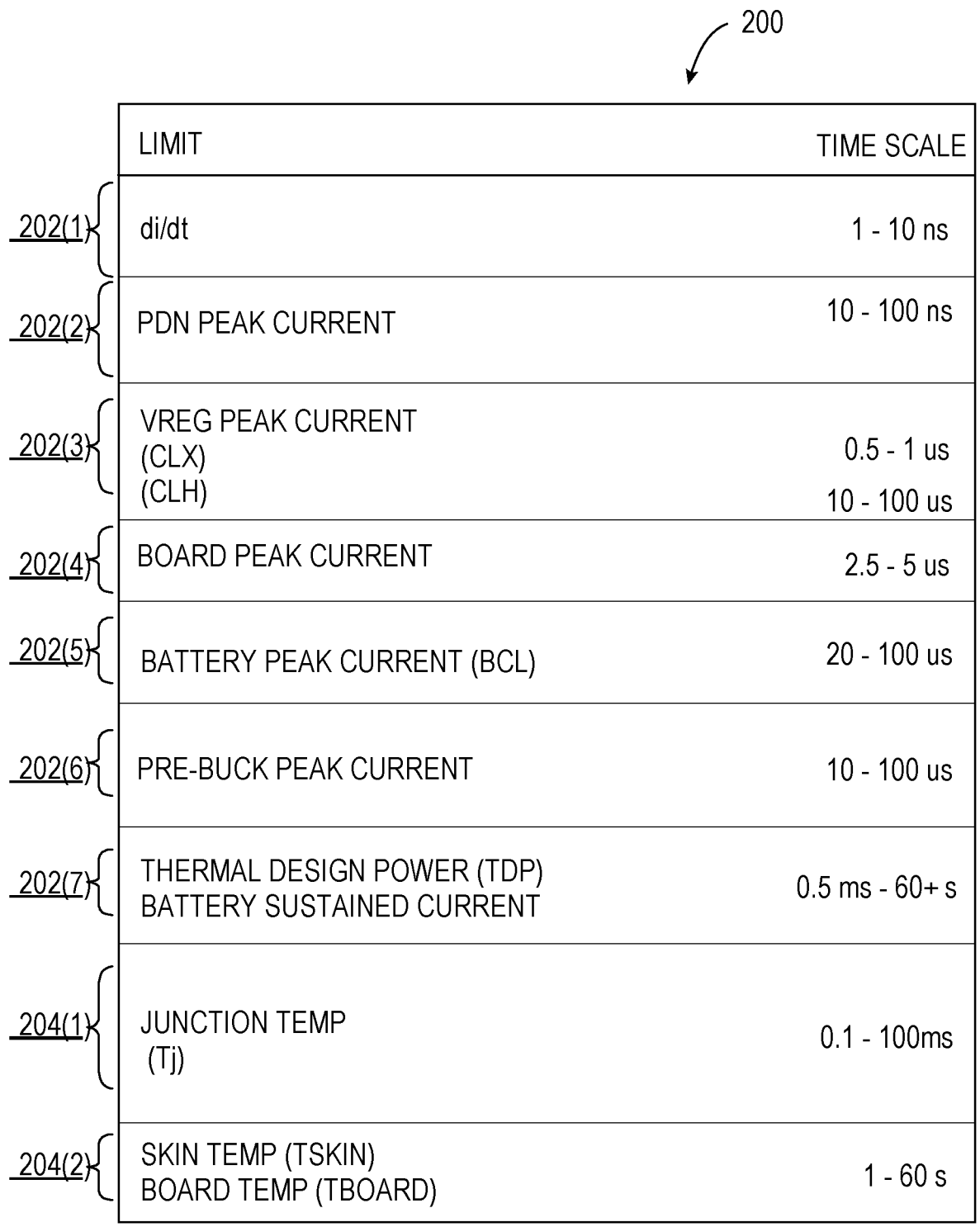
FIG. 2 is a table illustrating exemplary time-based power limits that can be desired power consumption limitations for the processor-based system in FIG. 1.

For example, FIG. 2 is a table 200 illustrating exemplary time-based power limits 202(1)-202(7) that can be desired power consumption limitations for the processor-based system 100 in FIG. 1. As shown in FIG. 2, a first time-based power limit 202(1) for the processor-based system 100 may be for a sudden change in a current flow rate referred to as a "di/dt" event, which may cause a voltage droop for example. This time-based power limit 202(1) is for a time duration in resolution of nanoseconds (ns), such as between 1-10 ns. A second time-based power limit 202(2) for the processor-based system 100 may be for a power distribution network (PDN) peak current in the processor-based system 100 for a time duration between 10-100 ns. A third time-based power limit 202(3) for the processor-based system 100 may be for a voltage regulator peak current for a time duration of microseconds (μs), such as 0.5-1.0 μs, or 10-100 μs. A fourth time-based power limit 202(4) for the processor-based system 100 may be for a circuit board peak current for a time duration of 2.5-5.0 μs. A fifth time-based power limit 202(5) for the processor-based system 100 may for peak current of the battery 132 for a time duration of 20-100 μs, so as to preserve the health of the battery 132. A sixth time-based power limit 202(6) for the processor-based system 100 may for peak current of the pre-buck power circuit 138 for a time duration of 10-100 μs. A seventh time-based power limit 202(7) for the processor-based system 100 may for a thermal design power limit of sustained current levels over a longer time duration, such as 0.5 milliseconds (ms) to 60 seconds(s).

As shown in FIG. 2, the processor-based system 100 may also have time-based temperature limits 204(1)-204(2). For example, a first time-based temperature limit 204(1) for the processor-based system 100 may be a junction temperature limit for a time duration of 0.1-100 ms to control excess heat generated and/or to maintain the processor-based system 100. A second time-based temperature limit 204(2) for the processor-based system 100 may be a board temperature limit for a time duration of 1-60 s to maintain the processor-based system 100 within skin temperature limits.

In this regard, as shown in the processor-based system 100 in FIG. 1 and discussed by examples in more detail below, the processor-based system 100 includes the power limiter circuit 108 that is configured to allocate a determined total PU power limit budget to the PU sub-system 102 to constrain its power consumption based on multiple time-based power limits for the processor-based system 100. In the example processor-based system 100 in FIG. 1, the power limiter circuit 108 has a power estimator and budget allocation circuit 142 that is configured to execute instructions to generate power budget allocations for the processor-based system 100 and the PU sub-system 102 to cause their power consumption to be constrained. As discussed in more detail below, the power limiter circuit 108 is configured to generate a total PU sub-system power limit budget 144 based on managing multiple power limits to cause the power consumption in the PU sub-system 102 to be constrained to the total PU sub-system power limit budget 144. Also, in this example, as discussed in more detail below, the SoC 112 in this example also includes a PU power budget management circuit 146 that is configured to further allocate the total PU sub-system power limit budget 144 to respective PU power limit budgets 148(1)-148(4), 148(P) for each PU 104(1)-104(4), 104(P) used to constrain the power consumption of the individual PUs 104(1)-104(4), 104(P). For example, the PU power budget management circuit 146 may be configured to allocate the total PU sub-system power limit budget 144 to individual PU power limit budgets 148(1)-148(4), 148(P) based on the relative workloads of the PUs 104(1)-104(4), 104(P). For example, this can allow performance of the PUs 104(1)-104(4), 104(P) to be optimized relative to their power demand according to their workloads, with the overall confines of the total PU sub-system power limit budget 144.

Figure 3:
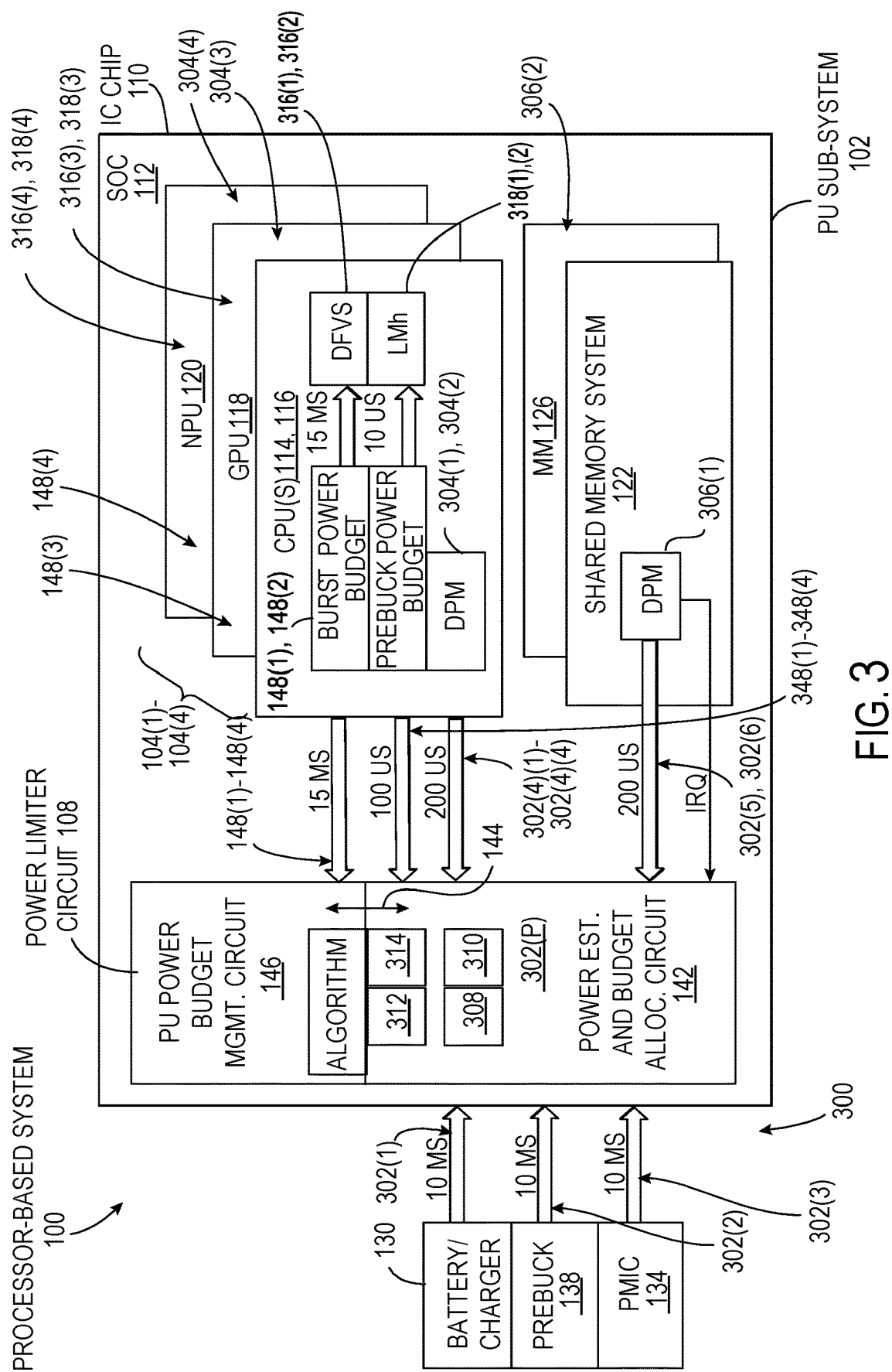
FIG. 3 is a schematic diagram of the PU sub-system in the processor-based system in FIG. 1, wherein the PU sub-system includes a power limiter circuit configured to allocate a determined total PU power limit budget to the PU sub-system to constrain its power consumption to a total PU sub-system power limit budget based on multiple time-based power limits, and a PU power budget management circuit configured to allocate the total PU sub-system power limit budget to the different PUs in the PU sub-system to optimize their individual performances.

FIG. 3 is a schematic diagram of the PU sub-system 102 in the processor-based system 100 in FIG. 1 illustrating additional exemplary detail. As shown in FIG. 3, the power limiter circuit 108 includes the PU power estimator and budget allocation circuit 142 that is configured to generate the total PU sub-system power limit budget 144 to constrain the power consumption of the PU sub-system 102 based on multiple time-based power limits. Also, as shown in FIG. 3, the power limiter circuit 108 includes the PU power budget management circuit 146 that is configured to allocate the individual PU power limit budgets 148(1)-148(4) from the total PU sub-system power limit budget 144 to constrain the power consumption of the individual PUs 104(1)-104(4) in the SoC 112. In this example, as discussed below, the individual PU power limit budgets 148(1)-148(4) are individual PU burst power limit budgets 148(1)-148(4) that are used by the PUs 104(1)-104(4) to constrain the burst power consumption of the PUs 104(1)-104(4). For example, a burst power limit may be a power limit that is over a burst power time limit, such as fifteen (15) ms or less as a non-limiting example. In this example, the power limiter circuit 108 and its PU power estimator and budget allocation circuit 142 and PU power budget management circuit 146 are provided as part of the SoC 112 that contains the PU sub-system 102 and the PUs 104(1)-104(4) for convenience purposes, but such is not required.

As shown in FIG. 3, the power estimator and budget allocation circuit 142 of the power limiter circuit 108 is configured to receive power telemetry data 300 from devices in the processor-based system 100 that are indicative of the current power consumption in the processor-based system 100. As discussed below, the power estimator and budget allocation circuit 142 uses the power telemetry data 300 to determine a current power consumption of the processor-based system 100, so that the power estimator and budget allocation circuit 142 can generate a system power limit budget for system devices in the processor-based system 100 and generate a PU sub-system power limit budget for constraining the power consumption of the PUs 104(1)-104(4). The power estimator and budget allocation circuit 142 is configured to generate these system power limit budget(s) and PU sub-system power limit budget based on whether the current power consumption of the processor-based system 100 is exceeding system power limits. For example, there may be a system power limit for power consumption of the processor-based system 100 based on performance, thermal limits, and/or skin temperature limits as previously discussed.

For example, the power estimator and budget allocation circuit 142 is configured to receive battery and charging power consumption 302(1) from the battery charging circuit 130. When connected to a power source, the battery charging circuit 130 is configured to charge the battery 132 (FIG. 1). In this example, the battery charging circuit 130 is configured to provide the battery and charging power consumption 302(1) every ten (10) ms to the power estimator and budget allocation circuit 142. The power estimator and budget allocation circuit 142 is also configured to receive pre-buck power consumption 302(2) from the pre-buck power circuit 138 that is indicative of the burst power used to provide burst power in response to burst power demands by the processor-based system 100. In this example, the pre-buck power circuit 138 is configured to provide the pre-buck power consumption 302(2) every ten (10) ms. The power estimator and budget allocation circuit 142 is also configured to receive system power consumption 302(3) from the PMIC 134 that is indicative of the system power provided to power the processor-based system 100. In this example, the PMIC 134 is configured to provide the system power consumption 302(3) every ten (10) ms.

The power estimator and budget allocation circuit 142 is also configured to receive a PU current power consumption 302(4)(1)-304(4)(4) indicating the current power consumption in the PUs 104(1)-104(4). For example, a PU sub-system power monitoring circuits (digital power monitoring (DPM) circuit) 304(1)-304(4) may be associated with the respective PUs 104(1)-104(4) to measure the PU current power consumption 302(4)(1)-304(4)(4) in its respective PU 104(1)-104(4). The power monitoring circuits 304(1)-304(4) may each be configured to provide the PU current power consumption 302(4)(1)-304(4)(4) in its respective PU 104 (1)-104(4) every 200 μs for example. This is so that the power estimator and budget allocation circuit 142 can determine if the PU current power consumption 302(4)(1)-304 (4)(4) in the PUs 104(1)-104(4) is exceeding their respective PU power limit budgets 148(1)-148(4), and if so, adjust their PU power limit budgets 148(1)-148(4) to maintain the overall system time-based power limit 308 and/or PU sub-system time-based power limits 310. The power estimator and budget allocation circuit 142 is also configured to receive a current power consumption 302(5) indicating the current power consumption in the shared memory system 122 and multi-media system 126 in the PU sub-system 102. For example, system power monitoring circuits (DPMs) 306(1), 306(2) may be associated with the respective shared memory system 122 and multi-media system 126 to measure the current power consumption in its respective shared memory system 122 and multi-media system 126 and provide such current power consumption as the current power consumption 302(5), 302(6). The power monitoring circuits 306(1), 306(2) can also be configured to generate an interrupt request IRQ to indicate for the power estimator and budget allocation circuit 142 to poll the current power consumptions 302(5), 302(6). Thus, in this manner, the power estimator and budget allocation circuit 142 can estimate PU sub-system current power consumption 306P in the PU sub-system 102 in this example using the PU current power consumption 302(4)(1)-304(4)(4) and the current power consumption 302(5), 306(6).

The power estimator and budget allocation circuit 142 is configured to use the current power consumption 302(1)-302(6) to determine the current power consumption of the processor-based system 100 as well as the PU sub-system 102 and the PUs 104(1)-104(4). The power limiter circuit 108 and its power estimator and budget allocation circuit 142 in this example are configured with one or more system time-based power limits 308 and one or more PU sub-system time-based power limits 310. For example, the system time-based power limits 308 could include the time-based power limits 202(1)-202(5) 202(7) in FIG. 2 as an example. A system time-based power limit 308 may be a power limit of power consumption within a longer duration of time, such as greater than or equal to one (1) second. The PU sub-system time-based power limits 310 could include the time-based power limit 202(6) in FIG. 2 as another example. A PU sub-system time-based power limit 310 may be a power limit of power consumption within a shorter duration of time, such as less than or equal to fifteen (15) ms. The PU power estimator and budget allocation circuit 142 uses the system time-based power limits 308 and the PU sub-system time-based power limits 310 to allocate power budget limits for the processor-based system 100 and the PUs 104(1)-104(4) in the PU sub-system 102.

Figure 4:
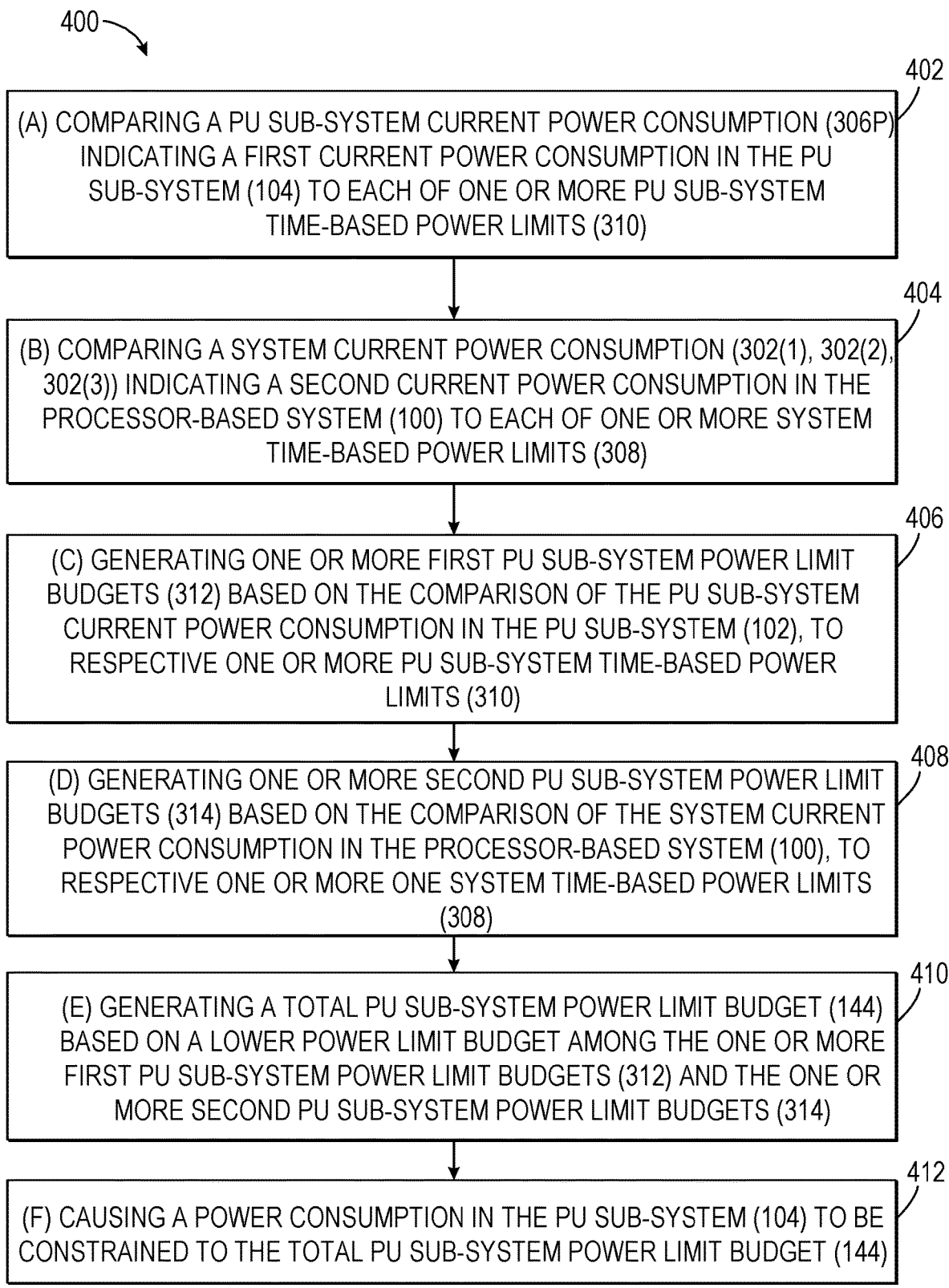
FIG. 4 is a flowchart illustrating an exemplary process of the power limiter circuit and its PU sub-system power budget allocation circuit in FIG. 3 allocating a determined total PU power limit budget to the PU sub-system to constrain its power consumption based on multiple time-based power limits for the processor-based system.

In this regard, as an example, with reference to an exemplary process 400 in FIG. 4, the power estimator and budget allocation circuit 142 is configured to compare the PU sub-system current power consumption 302P (e.g., from the current power consumptions 302(4)(1)-304(4)(4), 302 (5)-302(6)) indicating the current power consumption in the PU sub-system 102 to each of the one or more PU sub-system time-based power limits 310 (block 402 in FIG. 4). This is so that the power estimator and budget allocation circuit 142 can determine if the current power consumption in the PU sub-system 102 exceeds the respective PU sub-system time-based power limit(s) 310. The power estimator and budget allocation circuit 142 is also configured to compare the system current power consumptions 302(1)-302(3) indicating the current power consumption in the processor-based system 100 to each of the system time-based power limits 308 (block 404 in FIG. 4). This is so that the power estimator and budget allocation circuit 142 can determine if the current power consumption in the processor-based system 100 exceeds the respective system time-based power limit(s) 308.

With continuing reference to FIG. 4, the power estimator and budget allocation circuit 142 is then configured to generate one or more first PU sub-system power limit budgets 312 based on the comparison of the PU sub-system current power consumption in the PU sub-system 102, to each of the PU sub-system time-based power limits 310 (block 406 in FIG. 4). For example, the power estimator and budget allocation circuit 142 is configured to generate a separate first PU sub-system power limit budget 312 for each PU sub-system time-based power limit 310, based on a comparison of the PU sub-system current power consumption to each PU sub-system time-based power limit 310. The power estimator and budget allocation circuit 142 is also configured to generate one or more second PU sub-system power limit budgets 314 based on the comparison of the system current power consumption in the processor-based system 100, to each of the system time-based power limits 308 (block 408 in FIG. 4). For example, the power estimator and budget allocation circuit 142 may generate the one or more second PU sub-system power limit budgets 314 based on a remaining amount of power budget available after a power limit budget is allocated to one or more other non-PU devices 106 (FIG. 1). For example, the power estimator and budget allocation circuit 142 is configured to generate a separate second PU sub-system power limit budget 314 for each system time-based power limit 308, based on a comparison of the system current power consumption to each system time-based power limit 308.

The power estimator and budget allocation circuit 142 is then configured to generate the total PU sub-system power limit budget 144 based on a lower power limit budget among the one or more first PU sub-system power limit budgets 312 and the one or more second PU sub-system power limit budgets 314 (block 410 in FIG. 4). This is because as discussed in more detail below, the power estimator and budget allocation circuit 142 may be desired to use the most constrained power limit budget of the first and second PU sub-system power limit budgets 312, 314 to generate the total PU sub-system power limit budget 144. This is so that the power consumption in the PU sub-system 102 does not cause either the processor-based system 100 to exceed its overall power limit given the power consumption by other non-PU devices outside the PU sub-system 102, or the PU sub-system time-based power limits specific to the PU sub-system 102. By selecting the most constrained power limit budget of the first and second PU sub-system power limit budgets 312, 314 to generate the total PU sub-system power limit budget 144, the PU sub-system 102 can operate such that its current power consumption does not exceed the total PU sub-system power limit budget 144 (block 412 in FIG. 4). The process 400 in FIG. 4 can be continuously executed in a loop process so that the total PU sub-system power limit budget 144 is continuously updated according to the resolution of the received the power telemetry data 300. In this manner, the total PU sub-system power limit budget 144 can vary and increase or decrease as possible given the power budget available to provide power to the PU sub-system 102 and the processor-based system 100 as the PU sub-system 102 remains within the power consumption constraints of the time-based power limits 308, 310.

Then, as shown in FIG. 3, the PU power budget management circuit 146 in the power limiter circuit 108 is configured to receive the total PU sub-system power limit budget 144 to establish the respective PU power limit budgets 148(1)-148(4), 148(P) for each PU 104(1)-104(4), 104(P). The PU power budget management circuit 146 is configured to communicate the PU power limit budgets 148(1)-148(4), 148(P) to the respective PUs 104(1)-104(4), 104(P) for the PUs 104(1)-104(4), 104(P) to constrain their power consumption according to the respective PU power limit budgets 148(1)-148(4), 148(P). For example, the PU power budget management circuit 146 may provide updated PU power limit budgets 148(1)-148(4), 148(P) to the respective PUs 104(1)-104(4), 104(P) every fifteen (15) ms. The resolution of the timing of providing the updated PU power limit budgets 148(1)-148(4), 148(P) to the respective PUs 104(1)-104(4) should ideally (but not required) be based on the minimum time limit of the PU sub-system time-based power limits 310 so that the PUs 104(1)-104(4) can constrain their power consumption within the most stringent PU sub-system time-based power limit 310 to avoid or reduce exceeding power consumption beyond the PU sub-system time-based power limits 310. In this example, the PU power budget management circuit 146 may provide the updated PU power limit budgets 148(1)-148(4), 148(P) as PU burst power limit budgets 148(1)-148(4), 148(P) for constraining burst power consumption.

With continuing reference to FIG. 3, the PU power budget management circuit 146 in this example is configured to allocate the PU power limit budgets 148(1)-148(4) from the total PU sub-system power limit budget 144 to each PU 104(1)-104(4). The causes the current power consumption 302(4)(1)-302(4)(4) of the respective PUs 104(1)-104(4) to be constrained within their respective PU power limit budgets 148(1)-148(4). This is to maintain the current power consumption of the PU sub-system 102 within the PU sub-system time-based power limits 310, as well as the overall current power consumption of the processor-based system 100 within the system time-based power limits 308. As shown in FIG. 3, the PUs 104(1)-104(4) are each configured to use their respective received PU power limit budgets 148(1)-148(4) to set an operating point (operating frequency and/or voltage) of a dynamic voltage and frequency scaling (DVFS) circuit 316(1)-316(4) to control its respective current power consumptions 302(4)(1)-302(4)(4). For example, the PUs 104(1)-104(4) may be each configured to use their respective received PU power limit budgets 148(1)-148(4) to reset an operating point (operating frequency and/or voltage) of their respective DVFS circuit 316(1)-316(4) every fifteen (15) ms, for controlling current burst power consumption 302(4)(1)-302(4)(4). In this example, the PUs 104(1)-104(4) may also each be configured to use their respective received pre-buck PU power limit budgets 348(1)-348(4) generated by the power limiter circuit 108 to reset an operating point (e.g., operating frequency and/or operating voltage) of their respective circuits 318(1)-318(4) periodically (e.g., every 10 μs) to control pre-buck power consumption.

Figure 5A:
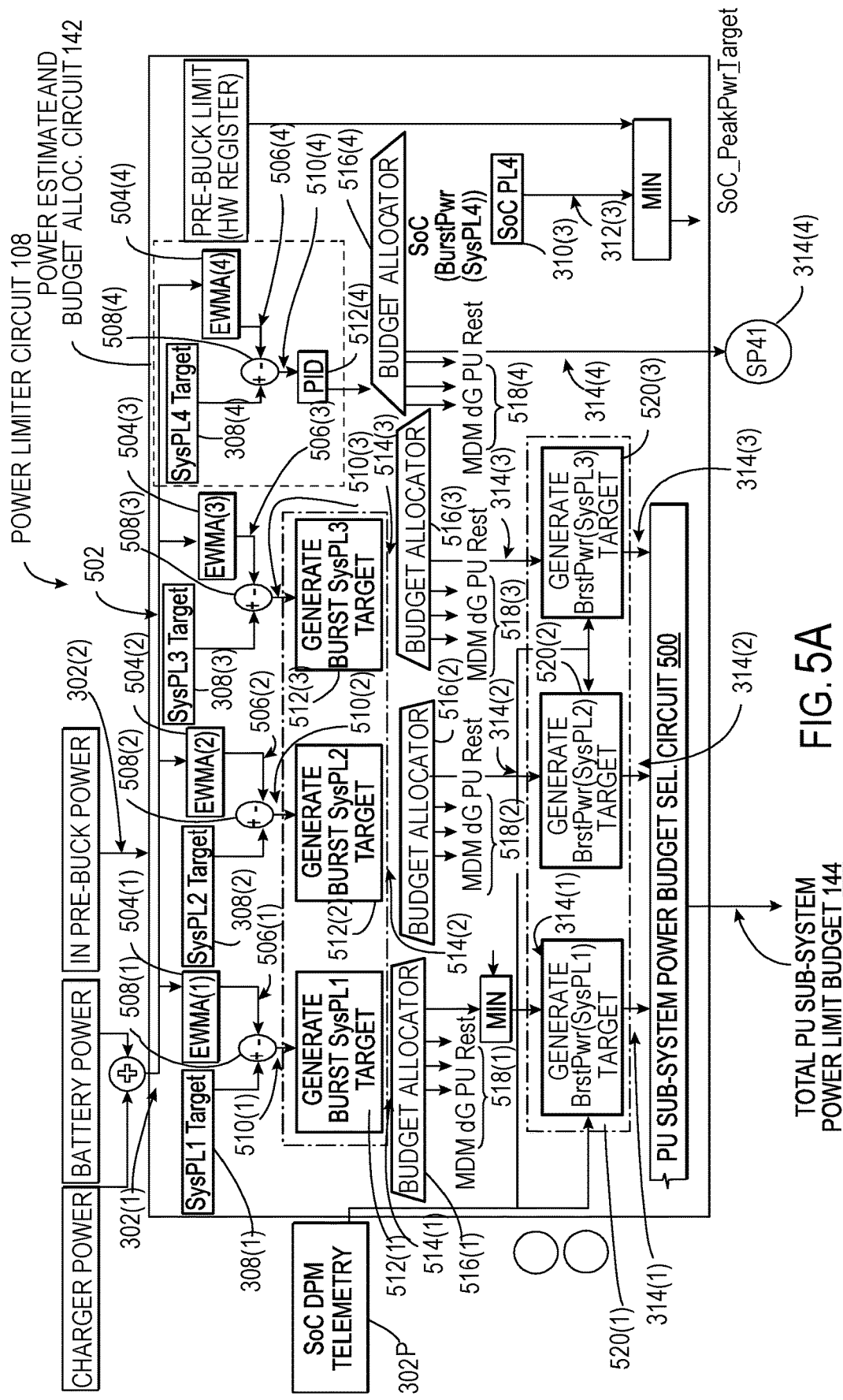
FIGS. 5A and 5B is a schematic diagram of an example of the power estimator and budget allocation circuit of the power limiter circuit in FIG. 3.
Figure 5B:
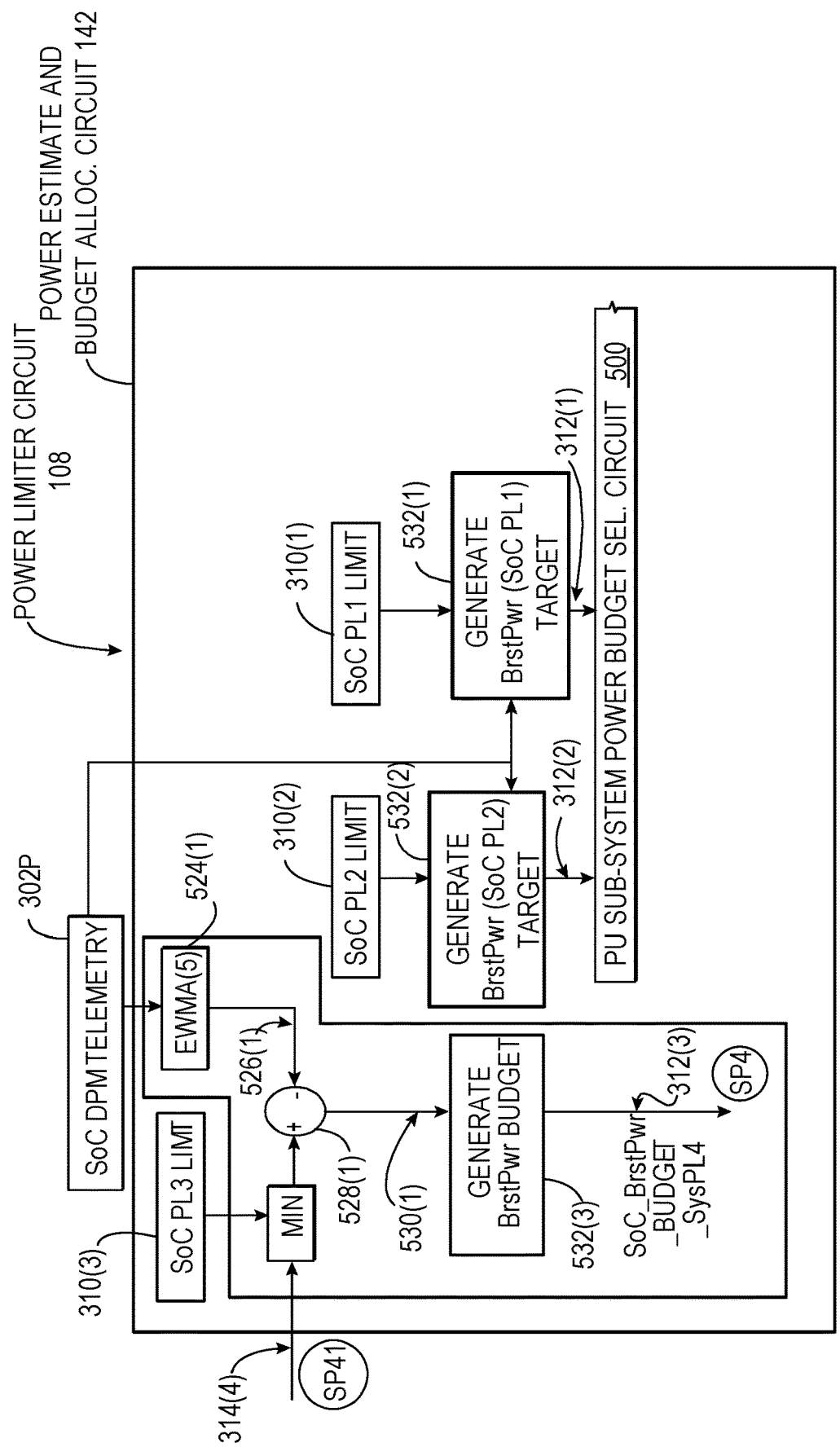

FIGS. 5A and 5B is a schematic diagram of an example of the power estimator and budget allocation circuit 142 of the power limiter circuit 108 in FIG. 3 to illustrate and discuss more exemplary details on how to provide the total PU sub-system power limit budget 144 to constrain the power consumption of the PU sub-system 102. FIG. 5A shows how multiple second PU sub-system power limit budgets 314(1)-314(4) are generated based on respective different system time-based power limits 308(1)-308(4). FIG. 5B shows how multiple first PU sub-system power budgets 312(1)-312(3) are generated based on respective different PU sub-system time-based power limits 310(1)-310(3). As shown in FIGS. 5A and 5B, the power estimator and budget allocation circuit 142 in this example includes a PU sub-system power budget selection circuit 500 that is configured to receive each of the first PU sub-system power limit budgets 312(1)-312(3) generated based on the different PU sub-system time-based power limits 310(1)-310(3), and each of the second PU sub-system power limit budgets 314(1)-314(4) generated based on the different system time-based power limits 308(1)-308(4). The PU sub-system power budget selection circuit 500 is configured to select the lower power limit budget among the first and second PU sub-system power limit budgets 312(1)-312(3), 314(1)-314(4) as the total PU sub-system power limit budget 144 to be used to constrain the power consumption of the PU sub-system 102 and its PUs 104(1)-104(4) (see FIG. 3).

In this regard, as shown in FIG. 5A, the power estimator and budget allocation circuit 142 is configured to receive the battery and charging current power consumption 302(1) as an indication of the system current power consumption 502 in the processor-based system 100. The system current power consumption 502 is provided to a plurality of filtering circuits 504(1)-504(4) that are provided for each of the system time-based power limits 308(1)-308(4). This is so that a second PU sub-system power limit budget 314(1)-314(4) can be generated for the different system time-based power limits 308(1)-308(4). The filtering circuits 504(1)-504(4) are each configured to sample the system current power consumption 502 over the time limit of its corresponding system time-based power limits 308(1)-308(4) to generate a respective sampled system current power consumption 506(1)-506(4) that is compatible with the time limit of the corresponding system time-based power limits 308(1)-308(4). The power estimator and budget allocation circuit 142 in this example also includes system comparator circuits 508(1)-508(4) that are each configured to receive a respective system time-based power limit 308(1) and a respective sampled system current power consumption 506(1)-506(4). The system comparator circuits 508(1)-508(4) are each configured to compare a respective sampled system current power consumption 506(1)-506(4) to a respective system time-based power limit 308(1)-308(4) and provide a respective difference power consumption 510(1)-510(4) indicating of the comparison to respective system power budget allocation circuits 512(1)-512(4).

The system power budget allocation circuits 512(1)-512(4) are each configured to generate a respective system burst power limit budget 514(1)-514(4) based on the comparison of the respective sampled system current power consumption 506(1)-506(4), to the respective system time-based power limit 308(1)-308(4). In this example, system burst power limit budgets 514(1)-514(4) are burst power limit budgets. The system power budget allocation circuits 512(1)-512(4) are each configured to convert the system burst power limit budgets 514(1)-514(4) to burst power limit budgets so that that these budgets can be used to generate the total PU sub-system power limit budget 144 based on the most constrained burst power limit in the processor-based system 100, as previously discussed. Then, as shown in FIG. 5A, system power budget allocation circuits 516(1)-516(4) are provided that are each configured to receive a respective system burst power limit budget 514(1)-514(4). The system power budget allocation circuits 516(1)-516(4) are configured to determine system burst power limit budgets 518(1)-518(4) out of the respective system burst power limit budgets 514(1)-514(4) for other non-PU devices 106 (e.g., a model (MDM)) in the processor-based system 100 that need to consume power for operation of the processor-based system 100. The system power budget allocation circuits 516(1)-516(4) are also configured to determine second PU sub-system power limit budgets 314(1)-314(4), which are second PU sub-system burst power limit budgets 314(1)-314(4) in this example, out of the respective system burst power limit budgets 514(1)-514(4) for the PU sub-system 102. The system power budget allocation circuits 516(1)-516(4) may be configured to prioritize the non-PU devices 106 or the PU sub-system 102 for allocating the system burst power limit budgets 514(1)-514(4) to the system burst power limit budgets 518(1)-518(4) and the second PU sub-system burst power limit budgets 314(1)-314(4).

With continuing reference to FIG. 5A, the power estimator and budget allocation circuit 142 can also optionally include PU sub-system burst power budget circuits 520(1)-520(3) that are each configured to receive the PU sub-system current power consumption 302P to determine if the second PU sub-system burst power limit budgets 314(1)-314(4) exceed the PU sub-system current power consumption 302P. If the PU sub-system current power consumption 302P does not exceed a respective second PU sub-system burst power limit budget 314(1)-314(4), the respective PU sub-system burst power budget circuit 520(1)-520(3) may retain or increase the respective second PU sub-system burst power limit budget 314(1)-314(4). If the PU sub-system current power consumption 302P exceeds a respective second PU sub-system burst power limit budget 314(1)-314(4), the respective PU sub-system burst power budget circuit 520(1)-520(3) may decrease the respective second PU sub-system burst power limit budget 314(1)-314(4). This additional optional function can be provided for an additional measure of safety and accuracy in generating the second PU sub-system burst power limit budgets 314(1)-314(4) since they were initially generated based on the system current power consumption 302(1). The final second PU sub-system burst power limit budgets 314(1)-314(4) are provided to the PU sub-system power budget selection circuit 500 to select the lower power limit budget among the second PU sub-system burst power limit budgets 314(1)-314(4) and the first PU sub-system burst power limit budgets 312(1)-312(3) generated by the power estimator and budget allocation circuit 142 as shown in FIG. 5B, now described.

As shown in FIG. 5B, the power estimator and budget allocation circuit 142 is configured to receive the PU sub-system current power consumption 302P as an indication of the current power consumption of the PU sub-system 102. The PU sub-system current power consumption 302P is provided to a filtering circuit 524(1) provided for the first PU sub-system time-based power limit 310(3). The filtering circuit 524(1) is configured to sample the PU sub-system current power consumption 302P over the time limit of its corresponding PU sub-system time-based power limit 310(3) to generate a sampled PU sub-system current power consumption 526(1) that is compatible with the time limit of the corresponding PU sub-system time-based power limit 310(3). The power estimator and budget allocation circuit 142 in this example also includes a PU sub-system comparator circuit 528(1) configured to receive the PU sub-system time-based power limit 310(3) and a respective sampled PU sub-system current power consumption 526(1).

The PU sub-system comparator circuit 528(1) is configured to compare the sampled PU sub-system current power consumption 526(1) to the PU sub-system time-based power limit 310(3) and provide a difference power consumption 530(1) indicating the comparison to a first PU sub-system power budget allocation circuit 532(3). The first PU sub-system power budget allocation circuit 532(3) is configured to generate a respective PU sub-system burst power limit budget 312(3) based on the comparison of the respective sampled PU sub-system current power consumption 526(1) to the PU sub-system time-based power limit 310(3). In this example, the system burst power limit budget 312(3) is a burst power limit budget. The first PU sub-system power budget allocation circuit 532(3) is configured to convert the PU sub-system burst power limit budget 312(3) to a burst power limit budget so that that this budget can be used to generate the total PU sub-system power limit budget 144 based on the most constrained burst power limit in the processor-based system 100, as previously discussed.

Note in this example, the PU sub-system comparator circuit 528(1) is configured to compare the sampled PU sub-system current power consumption 526(1) to the minimum of either the PU sub-system time-based power limit 310(3) or the second PU sub-system burst power limit budget 314(4) since the second PU sub-system burst power limit budget 314(4) is not coupled to the PU sub-system power budget selection circuit 500 in this example. In this example, as discussed in more detail below, the second PU sub-system burst power limit budget 314(4) is provided to the PU power budget management circuit 146 for allocating the total PU sub-system power limit budget 144.

With continuing reference to FIG. 5B, the first PU sub-system time-based power limits 310(1), 310(2) are provided to respective first PU sub-system power budget allocation circuits 532(1), 532(2). The first PU sub-system power budget allocation circuits 532(1), 532(2) are configured to generate respective PU sub-system burst power limit budgets 312(1), 312(2) based on the comparison of the PU sub-system current power consumption 302P to the respective PU sub-system time-based power limits 310(1), 310(2). In this example, PU sub-system burst power limit budgets 312(1), 312(1) are burst power limit budgets. The first PU sub-system power budget allocation circuits 532(1), 532(2) are each configured to convert the respective PU sub-system burst power limit budget 312(1), 312(2) to a respective burst power limit budget so that these budgets can be used to generate the total PU sub-system power limit budget 144 based on the most constrained burst power limit in the processor-based system 100, as previously discussed.

The final first PU sub-system burst power limit budgets 312(1)-312(3) are provided to the PU sub-system power budget selection circuit 500. The PU sub-system power budget selection circuit 500 is configured to select the lower power limit budget among the first PU sub-system burst power limit budgets 312(1)-312(3) generated by the power estimator and budget allocation circuit 142 as shown in FIG. 5B, and the second PU sub-system burst power limit budgets 314(1)-314(4) generated by the power estimator and budget allocation circuit 142 as shown in FIG. 5A, to provide the total PU sub-system power limit budget 144. As discussed above, the total PU sub-system power limit budget 144 is used by the PU power budget management circuit 146 in FIG. 3 to allocate the individual PU power limit budgets 148(1)-148(4) to constrain the power consumption of the PUs 104(1)-104(4) in the PU sub-system 102.

Figure 6:
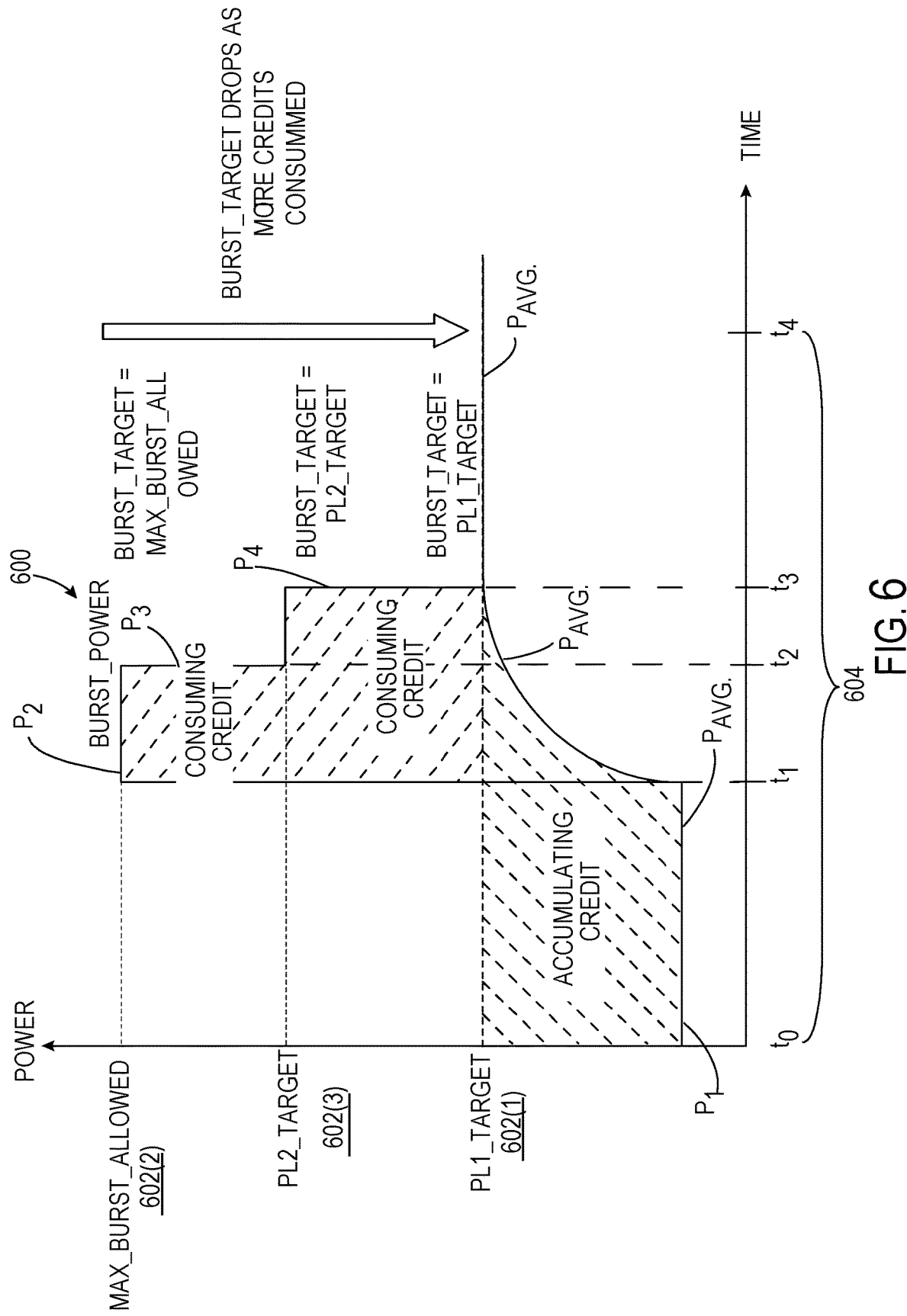
FIG. 6 is a power consumption graph illustrating power consumption as a function of time below and above respective time-based power limits for the processor-based system to illustrate the concept of generating a power limit budget based on tracked current power consumption in a time window to use power credits to offset power debits over the time window to avoid unnecessarily having to limit the power limit budget based on the highest instantaneous power consumption within the time window.

The first and second PU sub-system power budget allocation circuits 532(1)-532(3), 512(1)-512(3) in the power estimator and budget allocation circuit 142 in FIGS. 5A and 5B can also be configured to generate their respective first and second PU sub-system power limit budgets 312(1)-312(3), 314(1)-314(3) based on a current power consumption credit and debit scheme to further optimize the respective first and second PU sub-system power limit budgets 312(1)-312(3), 314(1)-314(3). This is shown by example in the power consumption graph 600 in FIG. 6. The power consumption graph 600 in FIG. 6 illustrates current power consumption (POWER) as a function of time (TIME) below and respective time-based burst power limit budgets 602(1), 602(2) for the processor-based system 100. The time-based burst power limit budgets 602(1), 602(2) could be any of the system or PU sub-system time-based power limits 308(1)-308(4), 310(1)-310(3) as examples. Current power consumption (POWER) over a time limit or burst time window 604 between a time t0 and a time t3 is shown in the power consumption graph 600.

As shown in FIG. 6, between time to and time t1, the current power consumption $P_1$ is below the desired power limit budget 602(1). The current power consumption $P_1$ is also the average power consumption $P_{AVG}$ as this point. Because the current power consumption $P_1$ is below the burst power limit budget 602(1), power credits are essentially realized in which the current power consumption could increase above the burst power limit budget 602(1) after time t1 and still result in an average power consumption $P_{AVG}$ over a burst time window 604 within the desired power limit budget 602(1). Power credits and debits are a summation of excesses and underages of a current power consumption with regard to the burst power limit budget 602(1) in this example. As shown in this example, if the current power consumption (POWER) were to then increase to current power consumption $P_2$ at time t2, the average power consumption $P_{AVG}$ over the burst time window 604 would start to increase, but not immediately exceed the burst power limit budget 602(1). Thus, the burst power limit budget could be temporarily increased to a maximum burst power limit budget 602(2) to allow the PU sub-system 102 to consume more average power consumption $P_{AVG}$ over the burst time window 604 for increased performance. Then, as shown at time t2, after the current power consumption has been at power $P_2$, the average power consumption $P_{AVG}$ provides a debit effect against the earlier power credits as the average power consumption $P_{AVG}$ starts to approach the desired burst power limit budget 602(1) for the burst time window 604. Thus, the burst power limit budget could be temporarily decreased to burst power limit budget 602(3) and still provide power debits, which is higher than the burst power limit budget 602(1), since the average power consumption $P_{AVG}$ is still not exceeding the original desired burst power limit budget 602(1). However, at time t3, the average power consumption $P_{AVG}$ in the burst time window 604 equals the desired burst power limit budget 602(1), meaning the earlier power credits between time t0 and t1 have been fully expended and debited. Thus, the power limit budget can be lowered back to the original burst power limit budget 602(1).

In this manner, using the power credit and debit scheme shown in FIG. 6, the power budget allocation circuits 532(1)-532(3), 512(1)-512(3) can further optimize the total PU sub-system power limit budget 144 for limiting the power consumption of the PU sub-system 102 when the generated total PU sub-system power limit budget 144 is not fully expended at a given burst time window. For example, with reference to FIG. 5A, a system power budget allocation circuit 512(1)-512(3) can be configured to track a system current burst power difference between the respective system burst power limit budget 514(1)-514(3) and the respective sampled system current power consumption 506(1)-506(3). The system power budget allocation circuit 512(1)-512(3) can be configured to adjust the respective system burst power limit budget 514(1)-514(3) based on the difference between the respective system burst power limit budget 514(1)-514(3) and the respective sampled system current power consumption 506(1)-506(3). The system power budget allocation circuit 512(1)-512(3) can be configured to increase the respective system burst power limit budget 514(1)-514(3) if the respective system burst power limit budget 514(1)-514(3) is less than the respective sampled system current power consumption 506(1)-506(3) or its average. The system power budget allocation circuit 512(1)-512(3) can be configured to decrease the respective system burst power limit budget 514(1)-514(3) if the respective system burst power limit budget 514(1)-514(3) is greater than the respective sampled system current power consumption 506(1)-506(3) or its average.

Further, using the power credit and debit scheme shown in FIG. 6, with reference to FIG. 5B, a PU sub-system power budget allocation circuit 532(1)-532(3) can be configured to track a PU sub-system current burst power difference between the respective PU sub-system burst power limit 310(1)-310(3) and the respective current power consumption 302P, 526(1). The PU sub-system power budget allocation circuit 532(1)-532(3) can be configured to adjust the respective PU sub-system burst power limit budget 312(1)-312(3) based on the difference between the respective PU sub-system burst power limit budget 312(1)-312(3) and the respective PU sub-system current power consumption 302P, 526(1). The PU sub-system power budget allocation circuit 532(1)-532(3) can be configured to increase the respective PU sub-system burst power limit budget 312(1)-312(3) if the respective PU sub-system burst power limit budget 312(1)-312(3) is less than the respective PU sub-system current power consumption 302P, 526(1) or its average. The PU sub-system power budget allocation circuit 532(1)-532(3) can be configured to decrease the respective PU sub-system burst power limit budget 312(1)-312(3) if the respective system burst power limit budget 312(1)-312(3) is greater than the respective PU sub-system current power consumption 302P, 526(1) or its average.

Figure 7:
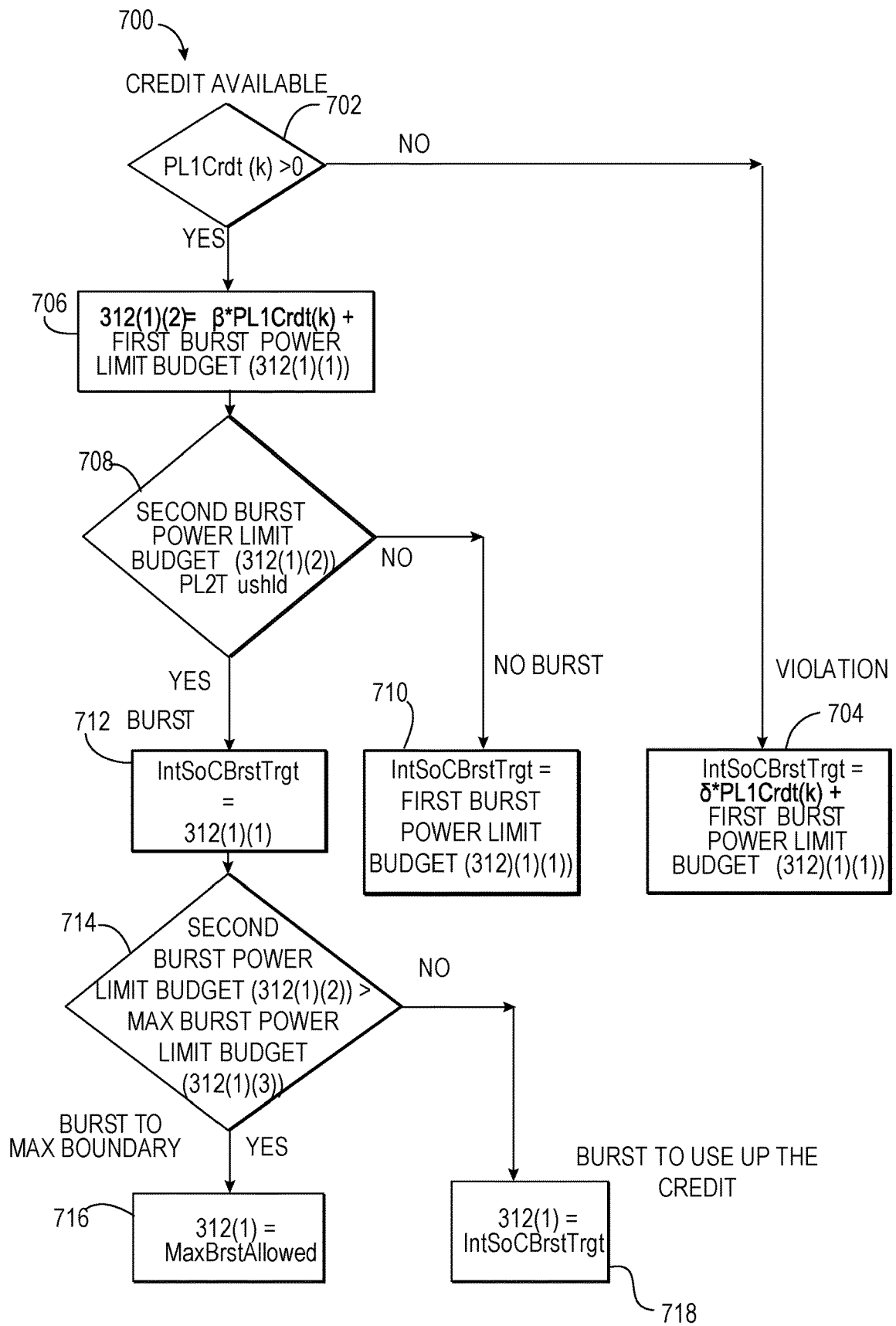
FIG. 7 is a flowchart illustrating an exemplary process of the PU sub-system power limiter circuit in FIGS. 5A and 5B generating a PU sub-system power limit budget based on tracking current power consumption in a time window to use power credits to offset power debits over the time window to avoid unnecessarily having to limit the PU sub-system power limit budget based on the highest instantaneous power consumption within the time window.

FIG. 7 is a flowchart illustrating an exemplary process 700 that any of the power budget allocation circuits 532(1)-532(3), 512(1)-512(3) in the PU power budget management circuit 146 in FIGS. 5A and 5B can perform to track current power consumption in a burst time window to use power credits to offset power debits over the time window to avoid unnecessarily having to limit its generated first and/or second PU sub-system power limit budgets 312(1)-312(3), 314(1)-314(3). The process 700 is discussed with regard to the PU sub-system power budget allocation circuit 532(1), but could be performed by any of the power budget allocation circuits 532(1)-532(3), 512(1)-512(3). In this regard, as shown in FIG. 7, a first step in the process 700 is to determine if a power budget credit (PL1Crdt) is available based on a power credit (block 702 in FIG. 7). If not, this is an error or violation. In this case, the instantaneous burst power limit budget (IntSpcBrstTrgt) used to set the current burst power limit budget is decreased by multiplying the power budget credit (PL1Crdt) by a negative multiplier value which is added to the original PU sub-system burst power limit budget 312(1) (block 704 in FIG. 7).

If there is an initial power budget credit (PL1Crdt) is available in box 702 in FIG. 7, then the PU sub-system power budget allocation circuit 532(1) calculates a second, higher PU sub-system burst power limit budget 312(1)(2) as a function of the power budget credit (PL1Crdt) plus a first, lower PU sub-system burst power limit budget 312(1)(1) times a multiplier value (block 706 in FIG. 7). The PU sub-system power budget allocation circuit 532(1) then determines if a second PU sub-system power limit budget 312(1)(2) exceeds a second burst power limit budget (PL2T rshld) (block 708 in FIG. 7). If not, the instantaneous burst power limit budget (IntSpcBrstTrgt) is set to the lower first PU sub-system burst power limit budget 312(1)(1) (block 710 in FIG. 7). If the second PU sub-system power limit budget 312(1)(2) exceeds the second burst power limit, this is a burst power demand situation wherein the instantaneous burst power limit budget (IntSpcBrstTrgt) is then set to the higher second PU sub-system power limit budget 312(1)(2) (block 712 in FIG. 7). Thereafter, the PU sub-system power budget allocation circuit 532(1) determines if the second PU sub-system burst power limit budget 312(1)(2) exceeds the maximum burst power limit budget 312(1)(3) allowed since it was determined there were power credits available back in block 702 (block 714 in FIG. 7), and if so, the PU sub-system burst power limit budget 312(1) is set to the maximum burst power limit budget 312(1)(3) (block 716 in FIG. 7). If the second PU sub-system burst power limit budget 312(1)(2) does not exceed the maximum burst power limit budget 312(1)(3) allowed, the PU sub-system burst power limit budget 312(1) is set to the instantaneous burst power limit budget 312(1)(2) (IntSpcBrstTrgt) to use up the power credits (block 718 in FIG. 7).

Figure 8:
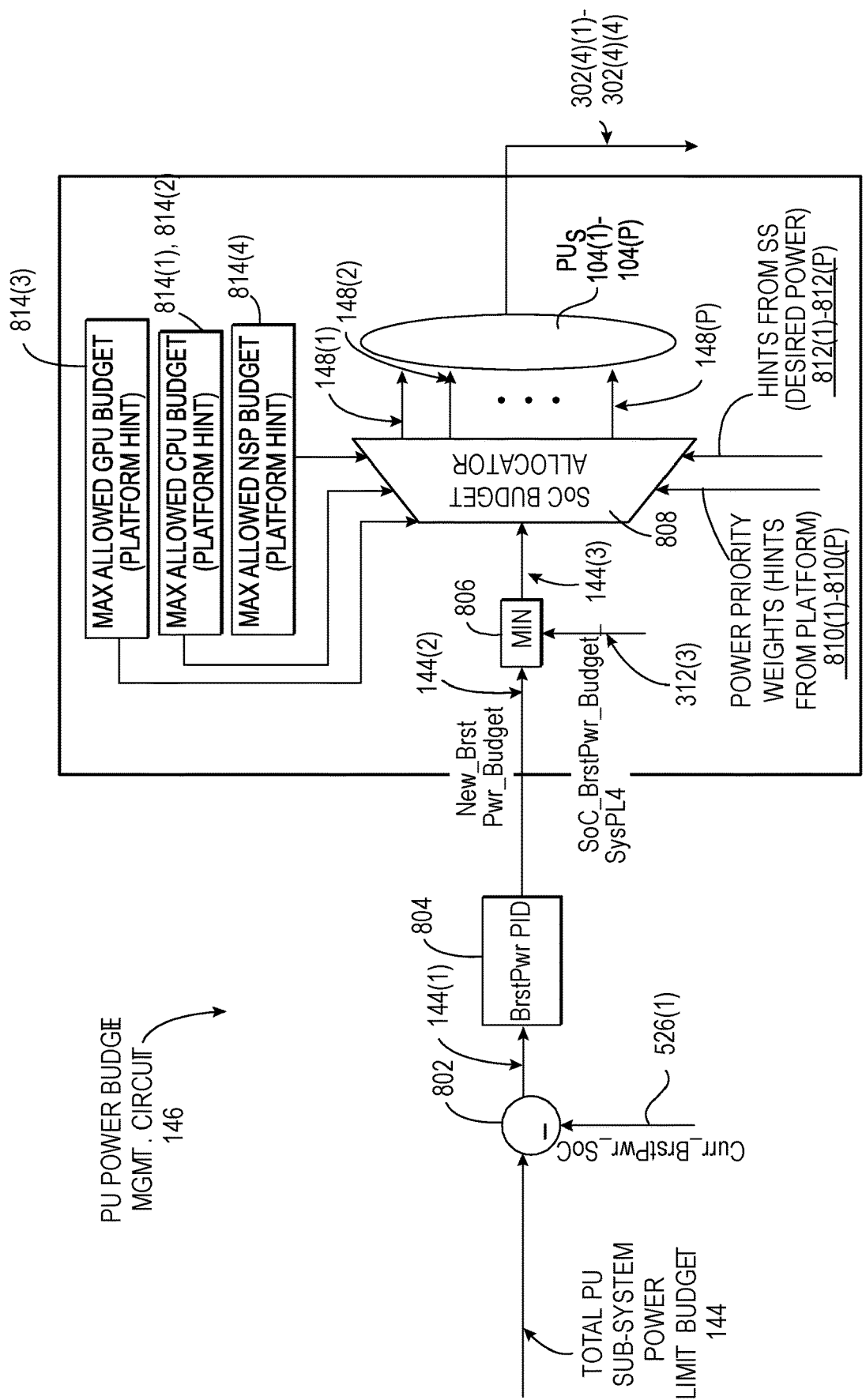
FIG. 8 is a schematic diagram of an exemplary PU power budget management circuit that can be provided as part of the power limiter circuit in FIG. 3, wherein the PU power budget management circuit is configured to allocate the determined total PU sub-system power limit budget to the different PUs in the PU sub-system to optimize their individual performances.

FIG. 8 is a schematic diagram of an exemplary PU power budget management circuit 146 that can be provided in the power limiter circuit 108 in FIGS. 3, 5A, and 5B. As discussed above with regard to FIGS. 3, 5A, and 5B, the PU power budget management circuit 146 is configured to allocate the determined total PU sub-system power limit budget 144 generated by the power estimator and budget allocation circuit 142 to the different PUs 104(1)-104(P) in the PU sub-system 102 to optimize their individual performances.

In this regard, as shown in FIG. 8, in this example, the PU power budget management circuit 146 includes a comparator circuit 802 that is configured to generate an adjusted total PU sub-system power limit budget 144(1) based on detecting if the sampled PU sub-system current power consumption 526(1) is different from the total PU sub-system power limit budget 144. For example, if the total PU sub-system power limit budget 144 is less than the sampled PU sub-system current power consumption 526(1), the total PU sub-system power limit budget 144 could be increased in the adjusted total PU sub-system power limit budget 144(1). If the total PU sub-system power limit budget 144 is greater than the sampled PU sub-system current power consumption 526(1), the total PU sub-system power limit budget 144 could be decreased in the adjusted total PU sub-system power limit budget 144(1). The PU power budget management circuit 146 in this example includes a proportional, integral, derivative (PID) circuit 804 to smooth out the adjusted total PU sub-system power limit budget 144(1) to provide such as a new total PU sub-system power limit budget 144(2) to be allocated to the PUs 104(1)-104(P).

With continuing reference to FIG. 8, the PU power budget management circuit 146 also includes a minimum circuit 806 configured to provide a final total PU sub-system power limit budget 144(3) as the lower of the new total PU sub-system power limit budget 144(2) and the PU sub-system burst power limit budget 312(3). This is so that a final total PU sub-system power limit budget 144(3) does not exceed a third PU sub-system burst power limit budget 312(3) which may be provided as the final total PU sub-system power limit budget 144(3) with the smallest time duration or limit. The PU power budget management circuit 146 also includes a PU budget allocation circuit 808 that is configured to allocate the PU power limit budgets 148(1)-148(P) to the respective PUs 104(1)-104(P) to constrain their power consumption. The PU budget allocation circuit 808 can be configured to allocate or split up the final total PU sub-system power limit budget 144(3) to the PU power limit budgets 148(1)-148(P) based on power priority hints 810(1)-810(P) that are provided from the respective PUs 104(1)-104(P). The PU budget allocation circuit 808 could also be configured to allocate or split up the final total PU sub-system power limit budget 144(3) to the PU power limit budgets 148(1)-148(P) based on power hints 812(1)-812(P) that are provided from the respective PUs 104(1)-104(P), which may be based on the workloads executed by the respective PUs 104(1)-104(P). The PU budget allocation circuit 808 could also be configured to allocate or split up the final total PU sub-system power limit budget 144(3) to the PU power limit budgets 148(1)-148(P) based on a requested or maximum allowed power limit budget 814(1)-814(4) for the respective PUs 104(1)-104(P), provided by the respective PUs 104(1)-104(P). In this regard, if power limit budget is available, the PU budget allocation circuit 808 can be configured to support a respective PU power limit budget 148(1)-148(P) to a respective PU 104(1)-104(4) as its requests.

Figure 9:
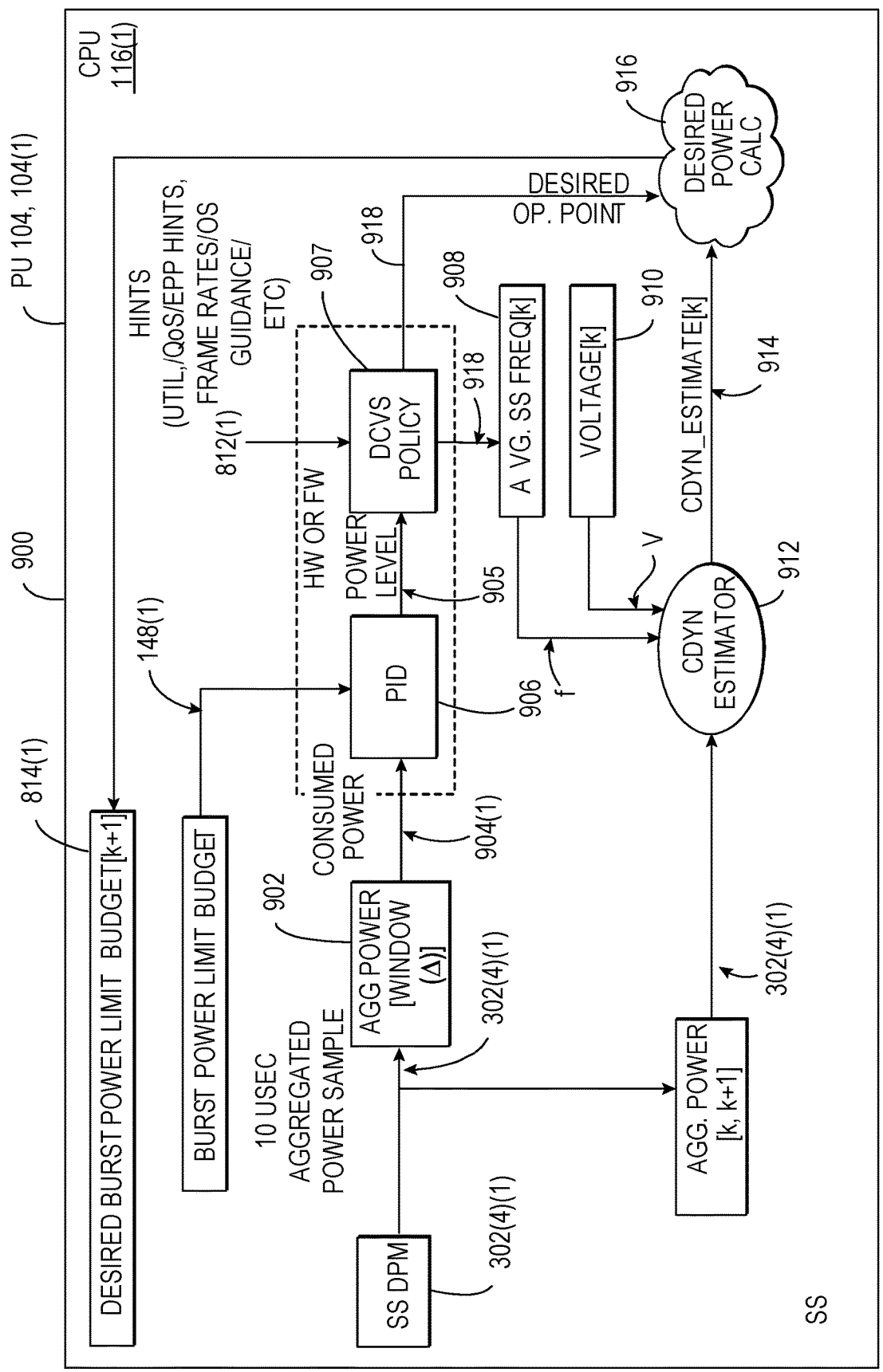
FIG. 9 is a schematic diagram of an exemplary PU power constraining circuit configured to constrain power consumption of the PUs in the PU sub-system based on the PU power limit budgets allocated by the PU power budget management circuit in FIGS. 3 and 8 to the respective PUs from the total PU sub-system power limit budget.

FIG. 9 is a schematic diagram of an exemplary PU power constraining circuit 900 that can be provided in any of the PUs 104(1)-104(P) to constrain power consumption of the respective PU 104(1)-104(P) based on the PU power limit budget 148(10-148(P) allocated by the PU power budget management circuit 146 in FIGS. 3 and 8. The PU power constraining circuit 900 is described as being included or and provided for the PU 104(1) to constrain its power consumption, but note that the PU power constraining 900 could be included in any of the PUs 104(1)-104(P).

In this regard, as shown in FIG. 9, the PU power constraining circuit 900 receives the PU current power consumption 302(4)(1) for the PU 104(1). The PU power constraining circuit 900 includes an averaging circuit 902 that averages the PU current power consumption 302(4)(1) over a burst window to provide a current burst power consumption 904(1). The PU power constraining circuit 900 includes a PID circuit 906 that smooths the current burst power consumption 904(1) into a desired power consumption level 905 to meet the PU burst power limit budget 148(1) for the PU 104(1). The PU power constraining circuit 900 also includes a DVFS policy circuit 907 that is configured to set an operating point 918 for operating the PU 104(1) based on the desired power consumption level 905. The set operating point 918 is communicated to a frequency circuit 908 configured to set an operating frequency f for the PU 104(1) based on the set operating point 918. The desired operating point 918 is also communicated to a voltage regulator circuit 910 configured to set an operating voltage V for the PU 104(1) based on the desired operating point 918. The operating frequency f and operating voltage V are provided to a power estimator circuit 912 configured to generate an estimated power consumption 914 of the PU 104(1) as compared to the desired operating points 918. A desired power calculation circuit 916 is configured to provide the desired maximum allowed burst power limit budget 814(1) to the PU power budget management circuit 146 in FIG. 8 based on whether the estimated power consumption 914 of the PU 104(1) based on the set operating point 918 is greater or less than the power consumption for the set operating point 918.

A processor-based system that includes a power limiter circuit, including, but not limited to, the power limiter circuits 108 in FIGS. 1, 3, 5A-5B, and 8, configured to allocate a total PU power limit budget to the PU-subsystem to constrain its power consumption based on multiple time-based power limits for the processor-based system, according to, but not limited to, the processes 400, 700 in FIGS. 4 and 7, and according to any aspects disclosed herein, may be provided in an IC package provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 10:
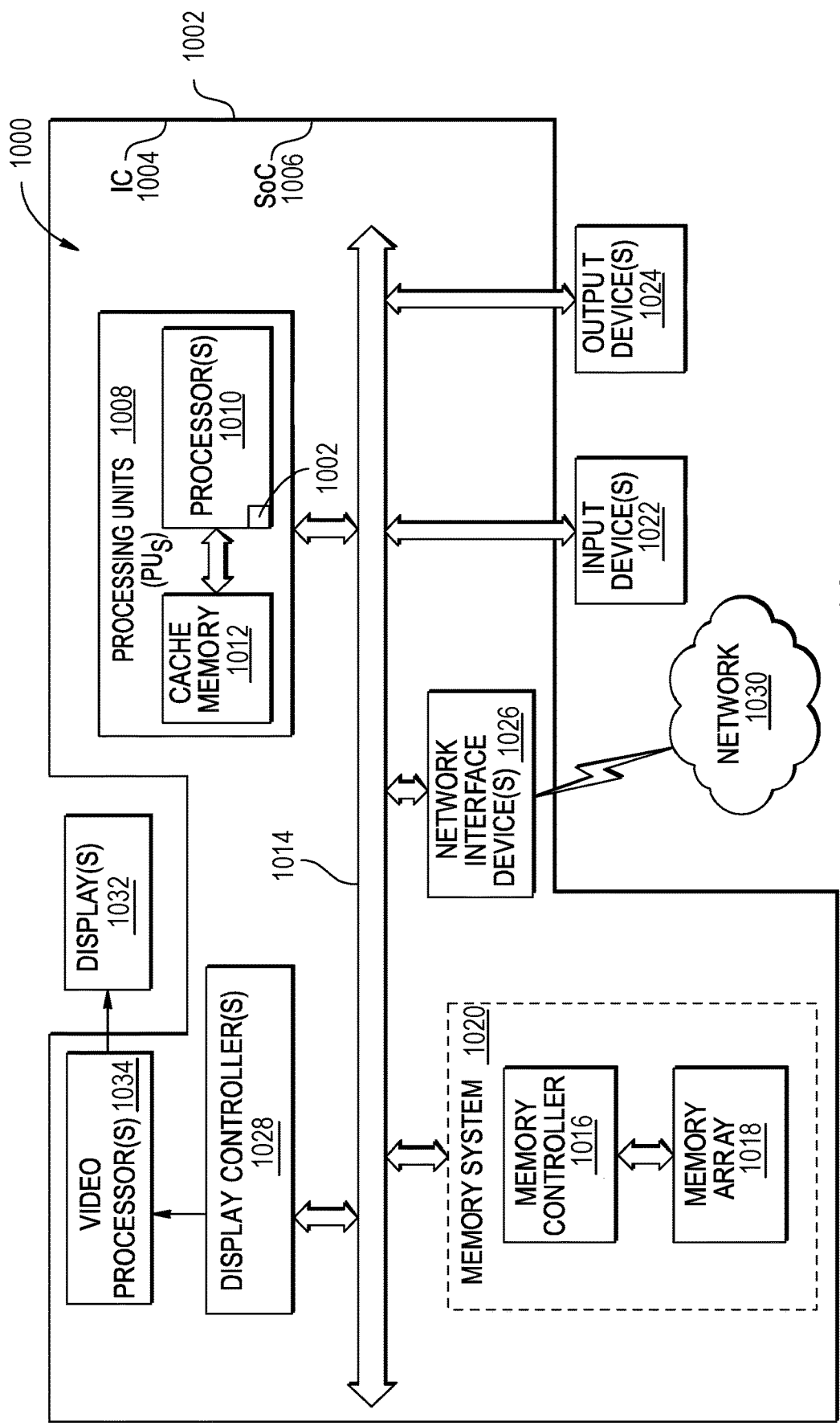
FIG. 10 is a block diagram of an exemplary processor-based system that includes a power limiter circuit, including, but not limited to, the power limiter circuits in FIGS. 1, 3, 5A-5B, and 8, configured to allocate a total PU power limit budget to the PU sub-system to constrain its power consumption based on multiple time-based power limits for the processor-based system, according to, but not limited to, the processes in FIGS. 4 and 7.

In this regard, FIG. 10 illustrates an example of a processor-based system 1000. The processor-based system 1000 can include a power limiter circuit 1002, including, but not limited to, the power limiter circuits 108 in FIGS. 1, 3, 5A-5B, and 8, configured to allocate a total PU power limit budget to the PU-subsystem to constrain its power consumption based on multiple time-based power limits for the processor-based system, according to, but not limited to, the processes 400, 700 in FIGS. 4 and 7, and according to any aspects disclosed herein. In this example, the processor-based system 1000 may be formed as an IC 1004 and as a system-on-a-chip (SoC) 1006. The processor-based system 1000 includes PUs 1008 that include one or more processors 1010, which can include a CPU, GPU, and NPU as examples, like the CPUs 114, 116, the GPU 118, and NPU 120 in the processor-based system 100 in FIG. 1. The PUs 1008 may have a shared memory 1012 (e.g., a shared cache memory) coupled to the PUs 1008 for rapid access to temporarily stored data. The PUs 1008 are coupled to a system bus 1014 and can intercouple master and slave devices included in the processor-based system 1000. As is well known, the PUs 1008 communicate with these other devices by exchanging address, control, and data information over the system bus 1014. For example, the PUs 1008 can communicate bus transaction requests to a memory controller 1016, as an example of a slave device. Although not illustrated in FIG. 10, multiple system buses 1014 could be provided, wherein each system bus 1014 constitutes a different fabric.

Other master and slave devices can be connected to the system bus 1014. As illustrated in FIG. 10, these devices can include a memory system 1020 that includes the memory controller 1016 and a memory array(s) 1018, one or more input devices 1022, one or more output devices 1024, one or more network interface devices 1026, and one or more display controllers 1028 as examples. The input device(s) 1022 can include any type of input device, including, but not limited to, input keys, switches, voice processors, etc. The output device(s) 1024 can include any type of output device, including, but not limited to, audio, video, other visual indicators, etc. The network interface device(s) 1026 can be any device configured to allow exchange of data to and from a network 1030. The network 1030 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1026 can be configured to support any type of communications protocol desired.

The PUs 1008 may also be configured to access the display controller(s) 1028 over the system bus 1014 to control information sent to one or more displays 1032. The display controller(s) 1028 sends information to the display(s) 1032 to be displayed via one or more video processors 1034, which process the information to be displayed into a format suitable for the display(s) 1032. The display controller(s) 1028 and video processor(s) 1034 can be included in the same or different ICs, or in the same IC 1004 containing the PUs 1008, as examples. The display(s) 1032 can include any type of display, including, but not limited to, a cathode ray tube (CRT), a liquid crystal display (LCD), a plasma display, a light emitting diode (LED) display, etc.

Figure 11:
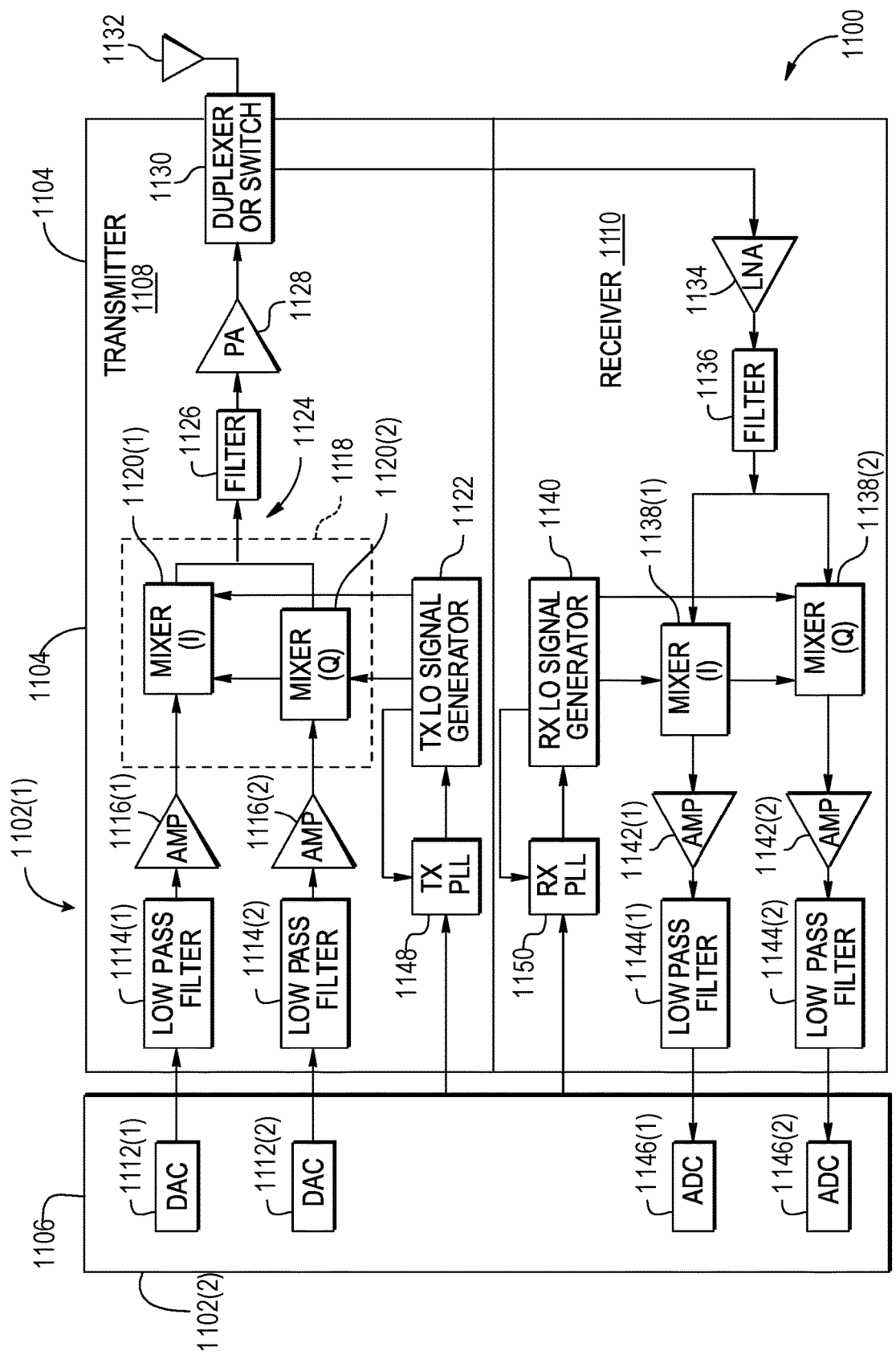
FIG. 11 is a block diagram of an exemplary wireless communications device that includes radio-frequency (RF) components that can include a processor-based system that includes a power limiter circuit, including, but not limited to, the power limiter circuits in FIGS. 1, 3, 5A-5B, and 8, configured to allocate a total PU power limit budget to the PU sub-system to constrain its power consumption based on multiple time-based power limits for the processor-based system, according to, but not limited to, the processes in FIGS. 4 and 7.

FIG. 11 illustrates an exemplary wireless communications device 1100 that includes radio frequency (RF) components and that includes power limiter circuits 1102(1), 1102(2) such as the power limiter circuit 108 in FIGS. 1, 3, 5A-5B, and 8, configured to allocate a total PU power limit budget to the PU-subsystem to constrain its power consumption based on multiple time-based power limits for the processor-based system, according to, but not limited to, the processes 400, 700 in FIGS. 4 and 7, and according to any aspects disclosed herein. The wireless communications device 1100 may include or be provided in any of the above-referenced devices, as examples. As shown in FIG. 11, the wireless communications device 1100 includes a transceiver 1104 and a data processor 1106, each of which may include its own power limiter circuit 1102(1), 1102(2). The data processor 1106 may include a memory to store data and program codes. The transceiver 1104 includes a transmitter 1108 and a receiver 1110 that support bi-directional communications. In general, the wireless communications device 1100 may include any number of transmitters 1108 and/or receivers 1110 for any number of communication systems and frequency bands. All or a portion of the transceiver 1104 may be implemented on one or more analog ICs, RF ICs (RFICs), mixed-signal ICs, etc.

The transmitter 1108 or the receiver 1110 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1110. In the direct-conversion architecture, a signal is frequency-converted between RF and baseband in one stage. The super-heterodyne and direct-conversion architectures may use different circuit blocks and/or have different requirements. In the wireless communications device 1100 in FIG. 11, the transmitter 1108 and the receiver 1110 are implemented with the direct-conversion architecture.

In the transmit path, the data processor 1106 processes data to be transmitted and provides I and Q analog output signals to the transmitter 1108. In the exemplary wireless communications device 1100, the data processor 1106 includes digital-to-analog converters (DACs) 1112(1), 1112

(2) for converting digital signals generated by the data processor 1106 into the I and Q analog output signals, e.g., I and Q output currents, for further processing.

Within the transmitter 1108, lowpass filters 1114(1), 1114(2) filter the I and Q analog output signals, respectively, to remove undesired signals caused by the prior digital-to-analog conversion. Amplifiers (AMPs) 1116(1), 1116(2) amplify the signals from the lowpass filters 1114(1), 1114(2), respectively, and provide I and Q baseband signals. An upconverter 1118 upconverts the I and Q baseband signals with I and Q transmit (TX) local oscillator (LO) signals through mixers 1120(1), 1120(2) from a TX LO signal generator 1122 to provide an upconverted signal 1124. A filter 1126 filters the upconverted signal 1124 to remove undesired signals caused by the frequency up-conversion as well as noise in a receive frequency band. A power amplifier (PA) 1128 amplifies the upconverted signal 1124 from the filter 1126 to obtain the desired output power level and provides a transmit RF signal. The transmit RF signal is routed through a duplexer or switch 1130 and transmitted via an antenna 1132.

In the receive path, the antenna 1132 receives signals transmitted by base stations and provides a received RF signal, which is routed through the duplexer or switch 1130 and provided to a low noise amplifier (LNA) 1134. The duplexer or switch 1130 is designed to operate with a specific receive (RX)-to-TX duplexer frequency separation, such that RX signals are isolated from TX signals. The received RF signal is amplified by the LNA 1134 and filtered by a filter 1136 to obtain a desired RF input signal. Down-conversion mixers 1138(1), 1138(2) mix the output of the filter 1136 with I and Q RX LO signals (i.e., LO_I and LO_Q) from an RX LO signal generator 1140 to generate I and Q baseband signals. The I and Q baseband signals are amplified by AMPs 1142(1), 1142(2) and further filtered by lowpass filters 1144(1), 1144(2) to obtain I and Q analog input signals, which are provided to the data processor 1106. In this example, the data processor 1106 includes analog-to-digital converters (ADCs) 1146(1), 1146(2) for converting the analog input signals into digital signals to be further processed by the data processor 1106.

In the wireless communications device 1100 of FIG. 11, the TX LO signal generator 1122 generates the I and Q TX LO signals used for frequency up-conversion, while the RX LO signal generator 1140 generates the I and Q RX LO signals used for frequency down-conversion. Each LO signal is a periodic signal with a particular fundamental frequency. A TX phase-locked loop (PLL) circuit 1148 receives timing information from the data processor 1106 and generates a control signal used to adjust the frequency and/or phase of the TX LO signals from the TX LO signal generator 1122. Similarly, an RX PLL circuit 1150 receives timing information from the data processor 1106 and generates a control signal used to adjust the frequency and/or phase of the RX LO signals from the RX LO signal generator 1140.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device or processing unit, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A power limiter circuit for limiting power consumption in a processor-based system comprising a processing unit (PU) sub-system comprising one or more PUs, the power limiter circuit configured to:
   (a) compare a PU sub-system current power consumption indicating a first current power consumption in the PU sub-system to each of one or more PU sub-system time-based power limits;
   (b) compare a system current power consumption indicating a second current power consumption in the processor-based system to each of one or more system time-based power limits;
   (c) generate one or more first PU sub-system power limit budgets based on the comparison of the PU sub-system current power consumption in the PU sub-system, to the one or more PU sub-system time-based power limits;
   (d) generate one or more second PU sub-system power limit budgets based on the comparison of the system current power consumption in the processor-based system, to respective one or more system time-based power limits;
   (e) generate a total PU sub-system power limit budget based on a lower power limit budget among the one or more first PU sub-system power limit budgets and the one or more second PU sub-system power limit budgets; and
   (f) cause a power consumption in the PU sub-system to be constrained to the total PU sub-system power limit budget.

2. The power limiter circuit of clause 1, further configured to:
   sample the PU sub-system current power consumption over a time limit of each of the one or more PU sub-system time-based power limits to generate one or more sampled PU sub-system current power consumptions; and
   configured to:
      compare the PU sub-system current power consumption by being configured to compare each of the one or more sampled PU sub-system current power consumptions to the respective one or more PU sub-system time-based power limits; and
      generate the one or more first PU sub-system power limit budgets based on the comparison of the one or more sampled PU sub-system current power consumptions to the respective one or more PU sub-system time-based power limits.

3. The power limiter circuit of clause 2, further configured to:
   sample the system current power consumption over a time limit of each of the one or more system time-based power limits to generate one or more sampled system current power consumptions; and
   configured to:
      compare the system current power consumption by being configured to compare each of the one or more sampled system current power consumptions to the respective one or more system time-based power limits; and
      generate the one or more second PU sub-system power limit budgets based on the comparison of the one or more sampled system current power consumptions to the respective one or more system time-based power limits.

4. The power limiter circuit of any of clauses 1-3, further configured to:
   convert the one or more first PU sub-system power limit budgets to respective one or more first PU sub-system burst power limit budgets based on a burst power time limit;
   convert the one or more second PU sub-system power limit budgets to respective one or more second PU sub-system burst power limit budgets based on the burst power time limit; and
   configured to:
      generate the total PU sub-system power limit budget based on a lower power limit budget among the one or more first PU sub-system burst power limit budgets and the one or more second PU sub-system burst power limit budgets.

5. The power limiter circuit of any of clauses 1-4, further configured to:
   convert the one or more PU sub-system time-based power limits to respective one or more PU sub-system burst power limits each over a burst power time limit;
   convert the one or more system time-based power limits to respective one or more system burst power limits over the burst power time limit; and
   configured to:
      compare the PU sub-system current power consumption by being configured to compare a PU sub-system current burst power consumption indicating a first current burst power consumption in the PU sub-system to each of the one or more PU sub-system burst power limits;
      compare the system current power consumption by being configured to compare a system current burst power consumption indicating a second current burst power consumption in the processor-based system to each of the one or more system burst power limits;
      generate the one or more first PU sub-system power limit budgets by being configured to generate one or more first PU sub-system burst power limit budgets based on the comparison of the PU sub-system current burst power consumption in the PU sub-system, to the respective one or more PU sub-system burst power limits;
      generate the one or more second PU sub-system power limit budgets by being configured to generate one or more second PU sub-system burst power limit budgets based on the comparison of the system current burst power consumption in the processor-based system, to the respective one or more system burst power limits;
      generate the total PU sub-system power limit budget by being configured to generate a total PU sub-system burst power limit budget based on a lower burst power limit budget among the one or more first PU sub-system burst power limit budgets and the one or more second PU sub-system burst power limit budgets; and
      cause the power consumption in the PU sub-system to be constrained to the total PU sub-system burst power limit budget.

6. The power limiter circuit of clause 5, wherein the burst power time limit is less than or equal to fifteen (15) milliseconds (ms).

7. The power limiter circuit of any of clauses 1-6 configured to generate the one or more second PU sub-system power limit budgets based on the comparison of the system current power consumption comprising a current power consumption from a battery and a battery charger in the processor-based system, to the one or more system time-based power limits.

8. The power limiter circuit of any of clauses 1-7 configured to:
generate the one or more first PU sub-system power limit budgets by being configured to decrease the one or more first PU sub-system power limit budgets based on the comparison of the first current power consumption in the PU sub-system being greater than the one or more PU sub-system time-based power limits; and
generate the one or more second PU sub-system power limit budgets by being configured to decrease the one or more second PU sub-system power limit budgets based on the comparison of the system current power consumption in the processor-based system being greater than the one or more system time-based power limits.

9. The power limiter circuit of any of clauses 1-7 configured to:
generate the one or more first PU sub-system power limit budgets by being configured to increase the one or more first PU sub-system power limit budgets based on the comparison of the first current power consumption in the PU sub-system being less than the one or more PU sub-system time-based power limits; and
generate the one or more second PU sub-system power limit budgets by being configured to increase the one or more second PU sub-system power limit budgets based on the comparison of the system current power consumption in the processor-based system being less than the one or more system time-based power limits.

10. The power limiter circuit of any of clauses 1-9 configured generate the one or more second PU sub-system power limit budgets by being configured to:
generate a system power limit budget for the processor-based system based on the comparison of the system current power consumption in the processor-based system, to the one or more system time-based power limits;
generate at least one non-PU sub-system power limit budget for constraining power in a non-PU sub-system in the processor-based system from the system power limit budget; and
generate the one or more second PU sub-system power limit budgets based a difference between the system power limit budget and the at least one non-PU sub-system power limit budget.

11. The power limiter circuit of clause 5, further configured to:
track one or more PU sub-system current burst power differences in the comparison of the PU sub-system current burst power consumption in the PU sub-system, to the respective one or more PU sub-system burst power limits over the burst power time limit;
generate one or more PU sub-system current burst power summations of the respective one or more PU sub-system current burst power differences in the comparison of the PU sub-system current burst power consumption in the PU sub-system to the respective one or more PU sub-system burst power limits over the burst power time limit; and generate the one or more first PU sub-system burst power limit budgets based on the comparison of the one or more PU sub-system current burst power summations to the respective one or more PU sub-system burst power limits.

12. The power limiter circuit of clause 5 or 11, further configured to:
track one or more system current burst power differences in the comparison of the system current burst power consumption in the processor-based system, to the respective one or more system burst power limits over the burst power time limit;
generate one or more system current burst power summations of the respective one or more system current burst power differences in the comparison of the system current burst power consumption in the processor-based system, to the respective one or more system burst power limits over the burst power time limit; and
generate the one or more second PU sub-system burst power limit budgets based on the comparison of the one or more system current burst power summations to the respective one or more system burst power limits.

13. The power limiter circuit of any of clauses 1-12, configured to:
compare the PU sub-system current power consumption to each of a plurality of PU sub-system time-based power limits;
generate the one or more first PU sub-system power limit budgets by being configured to generate a plurality of first PU sub-system power limit budgets based on the comparison of the PU sub-system current power consumption in the PU sub-system, to each of the plurality of PU sub-system time-based power limits; and
generate the total PU sub-system power limit budget based on a lower power limit budget among the plurality of first PU sub-system power limit budgets and the one or more second PU sub-system power limit budgets.

14. The power limiter circuit of clause 13, wherein the plurality of PU sub-system time-based power limits comprises:
a first PU sub-system time-based power limit having a first time limit less than or equal to fifteen (15) milliseconds (ms); and
a second PU sub-system time-based power limit having a second time limit greater than or equal to one (1) second(s).

15. The power limiter circuit of any of clauses 1-14, configured to:
compare the system current power consumption to each of a plurality of system time-based power limits;
generate the one or more second PU sub-system power limit budgets by being configured to generate a plurality of second PU sub-system power limit budgets based on the comparison of the system current power consumption in the processor-based system, to the respective plurality of system time-based power limits; and
generate the total PU sub-system power limit budget based on a lower power limit budget among the one or more first PU sub-system power limit budgets and the plurality of second PU sub-system power limit budgets.

16. The power limiter circuit of clause 15, wherein the plurality of system time-based power limits comprises:
a first system time-based power limit having a first time limit less than or equal to fifteen (15) milliseconds (ms); and a second system time-based power limit having a second time limit greater than or equal to one (1) second(s).

17. The power limiter circuit of clause 5, further configured to:
allocate a plurality of PU power limit budgets of the total PU sub-system power limit budget to each PU of the one or more PUs comprising a plurality of PUs; and
constrain a power consumption of each PU of the plurality of PUs based on a respective PU power limit budget allocated to each PU of the plurality of PU power limit budgets.

18. The power limiter circuit of clause 17, further configured to generate an adjusted total PU sub-system power limit budget based on the PU sub-system current burst power consumption compared to the total PU sub-system power limit; and
the power limiter circuit configured to allocate the plurality of PU power limit budgets of the adjusted total PU sub-system power limit budget to each PU of the plurality of PUs.

19. The power limiter circuit of clause 17 or 18, further configured to:
compare the PU sub-system current power consumption indicating the first current power consumption in the PU sub-system to a second PU sub-system burst power limit;
generate a third PU sub-system burst power limit budget based on the comparison of the PU sub-system current power consumption in the PU sub-system, to the second PU sub-system burst power limit;
generate an adjusted total PU sub-system power limit budget based on the lesser of the total PU sub-system power limit budget and the third PU sub-system burst power limit budget; and
the power limiter circuit configured to:
allocate the PU power limit budget by being configured to allocate the adjusted total PU sub-system power limit budget of the total PU sub-system power limit budget to each PU of the plurality of PUs.

20. The power limiter circuit of any of clauses 17-19, configured to allocate the PU power limit budget by being configured to allocate the PU power limit budget of the total PU sub-system power limit budget to each PU of the plurality of PUs based on a workload of each PU.

21. The power limiter circuit of any of clauses 17-20, configured to allocate the PU power limit budget by being configured to allocate the PU power limit budget of the total PU sub-system power limit budget to each PU of the plurality of PUs based on a PU hint of each PU.

22. The power limiter circuit of any of clauses 17-21, further configured to generate a desired PU power limit budget for each PU of the plurality of PUs indicating a desired power consumption by each PU; and
the power limiter circuit configured to allocate the PU power limit budget by being configured to allocate the PU power limit budget of the total PU sub-system power limit budget to each PU of the plurality of PUs based on the desired PU power limit budget of each PU.

23. The power limiter circuit of any of clauses 1-22, further comprising:
a power estimator and budget allocation circuit configured to:
compare the PU sub-system current power consumption indicating the first current power consumption in the PU sub-system to each of the one or more PU sub-system time-based power limits;
compare the system current power consumption indicating the second current power consumption in the processor-based system to each of the one or more system time-based power limits;
generate the one or more first PU sub-system power limit budgets based on the comparison of the PU sub-system current power consumption in the PU sub-system, to respective one or more PU sub-system time-based power limits;
generate the one or more second PU sub-system power limit budgets based on the comparison of the system current power consumption in the processor-based system, to respective one or more system time-based power limits; and
generate the total PU sub-system power limit budget based on the lower power limit budget among the one or more first PU sub-system power limit budgets and the one or more second PU sub-system power limit budgets; and
a PU power budget management circuit configured to:
allocate a PU power limit budget of the total PU sub-system power limit budget to each PU of the one or more PUs comprising a plurality of PUs; and
constrain the power consumption of each PU of the plurality of PUs based on the respective PU power limit budget allocated to each PU.

24. The power limiter circuit of clause 23, wherein the power estimator and budget allocation circuit comprises:
one or more PU sub-system comparator circuits each configured to compare the PU sub-system current power consumption in the PU sub-system to a PU sub-system time-based power limit of the one or more PU sub-system time-based power limits;
one or more system comparator circuits each configured to compare the system current power consumption in the processor-based system to a system time-based power limit of the one or more system time-based power limits;
one or more system power budget allocation circuits each configured to generate a second PU sub-system power limit budget of the one or more second PU sub-system power limit budgets based on the comparison of the system current power consumption in the processor-based system to the system time-based power limit of the one or more system time-based power limits; and
a PU sub-system power budget selection circuit configured to generate the total PU sub-system power limit budget based on the lower power limit budget among the one or more first PU sub-system power limit budgets and the one or more second PU sub-system power limit budgets.

25. The power limiter circuit of any of clauses 1-24, configured to continuously repeat (a)-(f).

26. The power limiter circuit of any of clauses 1-25 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

27. A method of limiting power consumption in a processor-based system comprising a processing unit (PU) sub-system comprising one or more PUs, comprising:
   (a) comparing a PU sub-system current power consumption indicating a first current power consumption in the PU sub-system to each of one or more PU sub-system time-based power limits;
   (b) comparing a system current power consumption indicating a second current power consumption in the processor-based system to each of one or more system time-based power limits;
   (c) generating one or more first PU sub-system power limit budgets based on the comparison of the PU sub-system current power consumption in the PU sub-system, to respective one or more PU sub-system time-based power limits;
   (d) generating one or more second PU sub-system power limit budgets based on the comparison of the system current power consumption in the processor-based system, to respective one or more system time-based power limits;
   (e) generating a total PU sub-system power limit budget based on a lower power limit budget among the one or more first PU sub-system power limit budgets and the one or more second PU sub-system power limit budgets; and
   (f) causing a power consumption in the PU sub-system to be constrained to the total PU sub-system power limit budget.

28. The method of clause 27, further comprising:
   sampling the PU sub-system current power consumption over a time limit of each of the one or more PU sub-system time-based power limits to generate one or more sampled PU sub-system current power consumptions; and
   wherein:
      comparing the PU sub-system current power consumption comprises comparing each of the one or more sampled PU sub-system current power consumptions to the respective one or more PU sub-system time-based power limits; and
      generating the one or more first PU sub-system power limit budgets comprises generating the one or more first PU sub-system power limit budgets based on the comparison of the one or more sampled PU sub-system current power consumptions to the respective one or more PU sub-system time-based power limits.

29. The method of clause 28, further comprising:
   sampling the system current power consumption over a time limit of each of the one or more system time-based power limits to generate one or more sampled system current power consumptions; and
   wherein:
      comparing the system current power consumption comprises comparing each of the one or more sampled system current power consumptions to the respective one or more system time-based power limits; and
      generating the one or more second PU sub-system power limit budgets comprises generating the one or more second PU sub-system power limit budgets based on the comparison of the one or more sampled system current power consumptions to the respective one or more system time-based power limits.

30. The method of any of clauses 27-29, further comprising:
   converting the one or more PU sub-system time-based power limits to respective one or more PU sub-system burst power limits each over a burst power time limit; and
   converting the one or more system time-based power limits to respective one or more system burst power limits over the burst power time limit;
   wherein:
      comparing the PU sub-system current power consumption comprises comparing a PU sub-system current burst power consumption indicating a first current burst power consumption in the PU sub-system to each of the one or more PU sub-system burst power limits;
      comparing the system current power consumption comprises comparing a system current burst power consumption indicating a second current burst power consumption in the processor-based system to each of the one or more system burst power limits;
      generating the one or more first PU sub-system power limit budgets comprises generating one or more first PU sub-system burst power limit budgets based on the comparison of the PU sub-system current burst power consumption in the PU sub-system, to the respective one or more PU sub-system burst power limits;
      generating the one or more second PU sub-system power limit budgets comprises generating one or more second PU sub-system burst power limit budgets based on the comparison of the system current burst power consumption in the processor-based system, to the respective one or more system burst power limits;
      generating the total PU sub-system power limit budget comprises generating a total PU sub-system burst power limit budget based on a lower burst power limit budget among the one or more first PU sub-system burst power limit budgets and the one or more second PU sub-system burst power limit budgets; and
      causing the power consumption in the PU sub-system to be constrained comprises causing the power consumption in the PU sub-system to be constrained to the total PU sub-system burst power limit budget.

31. The method of any of clauses 27-30, wherein generating the one or more second PU sub-system power limit budgets comprises:
   generating a system power limit budget for the processor-based system based on the comparison of the system current power consumption in the processor-based system, to the one or more system time-based power limits;
   generating at least one non-PU sub-system power limit budget for constraining power in a non-PU sub-system in the processor-based system from the system power limit budget; and
   generating the one or more second PU sub-system power limit budgets based a difference between the system power limit budget and the at least one non-PU sub-system power limit budget.

32. The method of clause 30, further comprising:
   tracking one or more PU sub-system current burst power differences in the comparison of the PU sub-system current burst power consumption in the PU sub-system, to the respective one or more PU sub-system burst power limits over the burst power time limit; and generating one or more PU sub-system current burst power summations of the respective one or more PU sub-system current burst power differences in the comparison of the PU sub-system current burst power consumption in the PU sub-system to the respective one or more PU sub-system burst power limits over the burst power time limit;

wherein:
generating the one or more first PU sub-system burst power limit budgets comprises generating the one or more first PU sub-system burst power limit budgets based on the comparison of the one or more PU sub-system current burst power summations to the respective one or more PU sub-system burst power limits.

33. The method of clause 30, further comprising:
allocating a plurality of PU power limit budgets of the total PU sub-system power limit budget to each PU of the one or more PUs comprising a plurality of PUs; and
constraining a power consumption of each PU of the plurality of PUs based on a respective PU power limit budget allocated to each PU of the plurality of PU power limit budgets.

34. The method of clause 33, further comprising generating an adjusted total PU sub-system power limit budget based on the PU sub-system current burst power consumption compared to the total PU sub-system power limit budget; and
wherein allocating the plurality of PU power limit budgets comprises allocating the plurality of PU power limit budgets of the adjusted total PU sub-system power limit budget allocated to each PU of the plurality of PUs.

35. A processor-based system, comprising:
a processing unit (PU) sub-system comprising one or more PUs;
a non-PU sub-system comprising one or more non-PU devices;
a PU sub-system power monitoring circuit configured to monitor PU sub-system current power consumption in the PU sub-system;
a system power monitoring circuit configured to monitor system current power consumption in the processor-based system;
one or more PU power constraining circuits each configured to constrain a PU of the one or more PUs; and
a power limiter circuit configured to:
(a) compare the PU sub-system current power consumption indicating a first current power consumption in the PU sub-system to each of one or more PU sub-system time-based power limits;
(b) compare the system current power consumption indicating a second current power consumption in the processor-based system to each of one or more system time-based power limits;
(c) generate one or more first PU sub-system power limit budgets based on the comparison of the PU sub-system current power consumption in the PU sub-system, to the one or more PU sub-system time-based power limits;
(d) generate one or more second PU sub-system power limit budgets based on the comparison of the system current power consumption in the processor-based system, to the one or more system time-based power limits;
(e) generate a total PU sub-system power limit budget based on a lower power limit budget among the one or more first PU sub-system power limit budgets and the one or more second PU sub-system power limit budgets; and
(f) constrain a power consumption in the PU sub-system to the total PU sub-system power limit budget.

What is claimed is:

1. A power limiter circuit for limiting power consumption in a processor-based system comprising a processing unit (PU) sub-system comprising one or more PUs, the power limiter circuit configured to:
(a) compare a PU sub-system current power consumption indicating a first current power consumption in the PU sub-system to each of one or more PU sub-system time-based power limits;
(b) compare a system current power consumption indicating a second current power consumption in the processor-based system to each of one or more system time-based power limits;
(c) generate one or more first PU sub-system power limit budgets based on the comparison of the PU sub-system current power consumption in the PU sub-system, to the one or more PU sub-system time-based power limits;
(d) generate one or more second PU sub-system power limit budgets based on the comparison of the system current power consumption in the processor-based system, to respective one or more system time-based power limits;
(e) generate a total PU sub-system power limit budget based on a lower power limit budget among the one or more first PU sub-system power limit budgets and the one or more second PU sub-system power limit budgets; and
(f) cause a power consumption in the PU sub-system to be constrained to the total PU sub-system power limit budget.

2. The power limiter circuit of claim 1, further configured to:
sample the PU sub-system current power consumption over a time limit of each of the one or more PU sub-system time-based power limits to generate one or more sampled PU sub-system current power consumptions; and
configured to:
compare the PU sub-system current power consumption by being configured to compare each of the one or more sampled PU sub-system current power consumptions to the respective one or more PU sub-system time-based power limits; and
generate the one or more first PU sub-system power limit budgets based on the comparison of the one or more sampled PU sub-system current power consumptions to the respective one or more PU sub-system time-based power limits.

3. The power limiter circuit of claim 2, further configured to:
sample the system current power consumption over a time limit of each of the one or more system time-based power limits to generate one or more sampled system current power consumptions; and
configured to:
compare the system current power consumption by being configured to compare each of the one or more sampled system current power consumptions to the respective one or more system time-based power limits; and generate the one or more second PU sub-system power limit budgets based on the comparison of the one or more sampled system current power consumptions to the respective one or more system time-based power limits.

4. The power limiter circuit of claim 1, further configured to:
convert the one or more first PU sub-system power limit budgets to respective one or more first PU sub-system burst power limit budgets based on a burst power time limit;
convert the one or more second PU sub-system power limit budgets to respective one or more second PU sub-system burst power limit budgets based on the burst power time limit; and
configured to:
generate the total PU sub-system power limit budget based on a lower power limit budget among the one or more first PU sub-system burst power limit budgets and the one or more second PU sub-system burst power limit budgets.

5. The power limiter circuit of claim 1, further configured to:
convert the one or more PU sub-system time-based power limits to respective one or more PU sub-system burst power limits each over a burst power time limit;
convert the one or more system time-based power limits to respective one or more system burst power limits over the burst power time limit; and
configured to:
compare the PU sub-system current power consumption by being configured to compare a PU sub-system current burst power consumption indicating a first current burst power consumption in the PU sub-system to each of the one or more PU sub-system burst power limits;
compare the system current power consumption by being configured to compare a system current burst power consumption indicating a second current burst power consumption in the processor-based system to each of the one or more system burst power limits;
generate the one or more first PU sub-system power limit budgets by being configured to generate one or more first PU sub-system burst power limit budgets based on the comparison of the PU sub-system current burst power consumption in the PU sub-system, to the respective one or more PU sub-system burst power limits;
generate the one or more second PU sub-system power limit budgets by being configured to generate one or more second PU sub-system burst power limit budgets based on the comparison of the system current burst power consumption in the processor-based system, to the respective one or more system burst power limits;
generate the total PU sub-system power limit budget by being configured to generate a total PU sub-system burst power limit budget based on a lower burst power limit budget among the one or more first PU sub-system burst power limit budgets and the one or more second PU sub-system burst power limit budgets; and
cause the power consumption in the PU sub-system to be constrained to the total PU sub-system burst power limit budget.

6. The power limiter circuit of claim 5, wherein the burst power time limit is less than or equal to fifteen (15) milliseconds (ms).

7. The power limiter circuit of claim 5, further configured to:
track one or more PU sub-system current burst power differences in the comparison of the PU sub-system current burst power consumption in the PU sub-system, to the respective one or more PU sub-system burst power limits over the burst power time limit;
generate one or more PU sub-system current burst power summations of the respective one or more PU sub-system current burst power differences in the comparison of the PU sub-system current burst power consumption in the PU sub-system to the respective one or more PU sub-system burst power limits over the burst power time limit; and
generate the one or more first PU sub-system burst power limit budgets based on the comparison of the one or more PU sub-system current burst power summations to the respective one or more PU sub-system burst power limits.

8. The power limiter circuit of claim 5, further configured to:
track one or more system current burst power differences in the comparison of the system current burst power consumption in the processor-based system, to the respective one or more system burst power limits over the burst power time limit;
generate one or more system current burst power summations of the respective one or more system current burst power differences in the comparison of the system current burst power consumption in the processor-based system, to the respective one or more system burst power limits over the burst power time limit; and
generate the one or more second PU sub-system burst power limit budgets based on the comparison of the one or more system current burst power summations to the respective one or more system burst power limits.

9. The power limiter circuit of claim 5, further configured to:
allocate a plurality of PU power limit budgets of the total PU sub-system power limit budget to each PU of the one or more PUs comprising a plurality of PUs; and
constrain a power consumption of each PU of the plurality of PUs based on a respective PU power limit budget allocated to each PU of the plurality of PU power limit budgets.

10. The power limiter circuit of claim 9, further configured to generate an adjusted total PU sub-system power limit budget based on the PU sub-system current burst power consumption compared to the total PU sub-system power limit; and
the power limiter circuit configured to allocate the plurality of PU power limit budgets of the adjusted total PU sub-system power limit budget to each PU of the plurality of PUs.

11. The power limiter circuit of claim 9, further configured to:
compare the PU sub-system current power consumption indicating the first current power consumption in the PU sub-system to a second PU sub-system burst power limit;
generate a third PU sub-system burst power limit budget based on the comparison of the PU sub-system current power consumption in the PU sub-system, to the second PU sub-system burst power limit;

generate an adjusted total PU sub-system power limit budget based on the lesser of the total PU sub-system power limit budget and the third PU sub-system burst power limit budget; and the power limiter circuit configured to:
allocate the PU power limit budget by being configured to allocate the adjusted total PU sub-system power limit budget of the total PU sub-system power limit budget to each PU of the plurality of PUs.

12. The power limiter circuit of claim 9, configured to allocate the PU power limit budget by being configured to allocate the PU power limit budget of the total PU sub-system power limit budget to each PU of the plurality of PUs based on a workload of each PU.

13. The power limiter circuit of claim 9, configured to allocate the PU power limit budget by being configured to allocate the PU power limit budget of the total PU sub-system power limit budget to each PU of the plurality of PUs based on a PU hint of each PU.

14. The power limiter circuit of claim 9, further configured to generate a desired PU power limit budget for each PU of the plurality of PUs indicating a desired power consumption by each PU; and the power limiter circuit configured to allocate the PU power limit budget by being configured to allocate the PU power limit budget of the total PU sub-system power limit budget to each PU of the plurality of PUs based on the desired PU power limit budget of each PU.

15. The power limiter circuit of claim 1 configured to generate the one or more second PU sub-system power limit budgets based on the comparison of the system current power consumption comprising a current power consumption from a battery and a battery charger in the processor-based system, to the one or more system time-based power limits.

16. The power limiter circuit of claim 1 configured to:
generate the one or more first PU sub-system power limit budgets by being configured to decrease the one or more first PU sub-system power limit budgets based on the comparison of the first current power consumption in the PU sub-system being greater than the one or more PU sub-system time-based power limits; and
generate the one or more second PU sub-system power limit budgets by being configured to decrease the one or more second PU sub-system power limit budgets based on the comparison of the system current power consumption in the processor-based system being greater than the one or more system time-based power limits.

17. The power limiter circuit of claim 1 configured to:
generate the one or more first PU sub-system power limit budgets by being configured to increase the one or more first PU sub-system power limit budgets based on the comparison of the first current power consumption in the PU sub-system being less than the one or more PU sub-system time-based power limits; and
generate the one or more second PU sub-system power limit budgets by being configured to increase the one or more second PU sub-system power limit budgets based on the comparison of the system current power consumption in the processor-based system being less than the one or more system time-based power limits.

18. The power limiter circuit of claim 1 configured generate the one or more second PU sub-system power limit budgets by being configured to:
generate a system power limit budget for the processor-based system based on the comparison of the system current power consumption in the processor-based system, to the one or more system time-based power limits;
generate at least one non-PU sub-system power limit budget for constraining power in a non-PU sub-system in the processor-based system from the system power limit budget; and
generate the one or more second PU sub-system power limit budgets based a difference between the system power limit budget and the at least one non-PU sub-system power limit budget.

19. The power limiter circuit of claim 1, configured to:
compare the PU sub-system current power consumption to each of a plurality of PU sub-system time-based power limits;
generate the one or more first PU sub-system power limit budgets by being configured to generate a plurality of first PU sub-system power limit budgets based on the comparison of the PU sub-system current power consumption in the PU sub-system, to each of the plurality of PU sub-system time-based power limits; and
generate the total PU sub-system power limit budget based on a lower power limit budget among the plurality of first PU sub-system power limit budgets and the one or more second PU sub-system power limit budgets.

20. The power limiter circuit of claim 19, wherein the plurality of PU sub-system time-based power limits comprises:
a first PU sub-system time-based power limit having a first time limit less than or equal to fifteen (15) milliseconds (ms); and
a second PU sub-system time-based power limit having a second time limit greater than or equal to one (1) second(s).

21. The power limiter circuit of claim 1, configured to:
compare the system current power consumption to each of a plurality of system time-based power limits;
generate the one or more second PU sub-system power limit budgets by being configured to generate a plurality of second PU sub-system power limit budgets based on the comparison of the system current power consumption in the processor-based system, to the respective plurality of system time-based power limits; and
generate the total PU sub-system power limit budget based on a lower power limit budget among the one or more first PU sub-system power limit budgets and the plurality of second PU sub-system power limit budgets.

22. The power limiter circuit of claim 21, wherein the plurality of system time-based power limits comprises:
a first system time-based power limit having a first time limit less than or equal to fifteen (15) milliseconds (ms); and
a second system time-based power limit having a second time limit greater than or equal to one (1) second(s).

23. The power limiter circuit of claim 1, further comprising:
a power estimator and budget allocation circuit configured to:
compare the PU sub-system current power consumption indicating the first current power consumption in the PU sub-system to each of the one or more PU sub-system time-based power limits;
compare the system current power consumption indicating the second current power consumption in the processor-based system to each of the one or more system time-based power limits;

generate the one or more first PU sub-system power limit budgets based on the comparison of the PU sub-system current power consumption in the PU sub-system, to respective one or more PU sub-system time-based power limits;

generate the one or more second PU sub-system power limit budgets based on the comparison of the system current power consumption in the processor-based system, to respective one or more system time-based power limits; and generate the total PU sub-system power limit budget based on the lower power limit budget among the one or more first PU sub-system power limit budgets and the one or more second PU sub-system power limit budgets; and a PU power budget management circuit configured to:
allocate a PU power limit budget of the total PU sub-system power limit budget to each PU of the one or more PUs comprising a plurality of PUs; and
constrain the power consumption of each PU of the plurality of PUs based on the respective PU power limit budget allocated to each PU.

24. The power limiter circuit of claim 23, wherein the power estimator and budget allocation circuit comprises:
one or more PU sub-system comparator circuits each configured to compare the PU sub-system current power consumption in the PU sub-system to a PU sub-system time-based power limit of the one or more PU sub-system time-based power limits;
one or more system comparator circuits each configured to compare the system current power consumption in the processor-based system to a system time-based power limit of the one or more system time-based power limits;
one or more system power budget allocation circuits each configured to generate a second PU sub-system power limit budget of the one or more second PU sub-system power limit budgets based on the comparison of the system current power consumption in the processor-based system to the system time-based power limit of the one or more system time-based power limits; and
a PU sub-system power budget selection circuit configured to generate the total PU sub-system power limit budget based on the lower power limit budget among the one or more first PU sub-system power limit budgets and the one or more second PU sub-system power limit budgets.

25. The power limiter circuit of claim 1, configured to continuously repeat (a)-(f).

26. The power limiter circuit of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

27. A method of limiting power consumption in a processor-based system comprising a processing unit (PU) sub-system comprising one or more PUs, comprising:

(a) comparing a PU sub-system current power consumption indicating a first current power consumption in the PU sub-system to each of one or more PU sub-system time-based power limits;

(b) comparing a system current power consumption indicating a second current power consumption in the processor-based system to each of one or more system time-based power limits;

(c) generating one or more first PU sub-system power limit budgets based on the comparison of the PU sub-system current power consumption in the PU sub-system, to respective one or more PU sub-system time-based power limits;

(d) generating one or more second PU sub-system power limit budgets based on the comparison of the system current power consumption in the processor-based system, to respective one or more system time-based power limits;

(e) generating a total PU sub-system power limit budget based on a lower power limit budget among the one or more first PU sub-system power limit budgets and the one or more second PU sub-system power limit budgets; and (f) causing a power consumption in the PU sub-system to be constrained to the total PU sub-system power limit budget.

28. The method of claim 27, further comprising:
sampling the PU sub-system current power consumption over a time limit of each of the one or more PU sub-system time-based power limits to generate one or more sampled PU sub-system current power consumptions; and wherein:
comparing the PU sub-system current power consumption comprises comparing each of the one or more sampled PU sub-system current power consumptions to the respective one or more PU sub-system time-based power limits; and
generating the one or more first PU sub-system power limit budgets comprises generating the one or more first PU sub-system power limit budgets based on the comparison of the one or more sampled PU sub-system current power consumptions to the respective one or more PU sub-system time-based power limits.

29. The method of claim 28, further comprising:
sampling the system current power consumption over a time limit of each of the one or more system time-based power limits to generate one or more sampled system current power consumptions; and wherein:
comparing the system current power consumption comprises comparing each of the one or more sampled system current power consumptions to the respective one or more system time-based power limits; and
generating the one or more second PU sub-system power limit budgets comprises generating the one or more second PU sub-system power limit budgets based on the comparison of the one or more sampled system current power consumptions to the respective one or more system time-based power limits.

30. The method of claim 27, further comprising:
converting the one or more PU sub-system time-based power limits to respective one or more PU sub-system burst power limits each over a burst power time limit; and
converting the one or more system time-based power limits to respective one or more system burst power limits over the burst power time limit;
wherein:
  comparing the PU sub-system current power consumption comprises comparing a PU sub-system current burst power consumption indicating a first current burst power consumption in the PU sub-system to each of the one or more PU sub-system burst power limits;
  comparing the system current power consumption comprises comparing a system current burst power consumption indicating a second current burst power consumption in the processor-based system to each of the one or more system burst power limits;
  generating the one or more first PU sub-system power limit budgets comprises generating one or more first PU sub-system burst power limit budgets based on the comparison of the PU sub-system current burst power consumption in the PU sub-system, to the respective one or more PU sub-system burst power limits;
  generating the one or more second PU sub-system power limit budgets comprises generating one or more second PU sub-system burst power limit budgets based on the comparison of the system current burst power consumption in the processor-based system, to the respective one or more system burst power limits;
  generating the total PU sub-system power limit budget comprises generating a total PU sub-system burst power limit budget based on a lower burst power limit budget among the one or more first PU sub-system burst power limit budgets and the one or more second PU sub-system burst power limit budgets; and
  causing the power consumption in the PU sub-system to be constrained comprises causing the power consumption in the PU sub-system to be constrained to the total PU sub-system burst power limit budget.

31. The method of claim 30, further comprising:
tracking one or more PU sub-system current burst power differences in the comparison of the PU sub-system current burst power consumption in the PU sub-system, to the respective one or more PU sub-system burst power limits over the burst power time limit; and
generating one or more PU sub-system current burst power summations of the respective one or more PU sub-system current burst power differences in the comparison of the PU sub-system current burst power consumption in the PU sub-system to the respective one or more PU sub-system burst power limits over the burst power time limit;
wherein:
  generating the one or more first PU sub-system burst power limit budgets comprises generating the one or more first PU sub-system burst power limit budgets based on the comparison of the one or more PU sub-system current burst power summations to the respective one or more PU sub-system burst power limits.

32. The method of claim 30, further comprising:
allocating a plurality of PU power limit budgets of the total PU sub-system power limit budget to each PU of the one or more PUs comprising a plurality of PUs; and
constraining a power consumption of each PU of the plurality of PUs based on a respective PU power limit budget allocated to each PU of the plurality of PU power limit budgets.

33. The method of claim 32, further comprising generating an adjusted total PU sub-system power limit budget based on the PU sub-system current burst power consumption compared to the total PU sub-system power limit budget; and
wherein allocating the plurality of PU power limit budgets comprises allocating the plurality of PU power limit budgets of the adjusted total PU sub-system power limit budget allocated to each PU of the plurality of PUs.

34. The method of claim 27, wherein generating the one or more second PU sub-system power limit budgets comprises:
generating a system power limit budget for the processor-based system based on the comparison of the system current power consumption in the processor-based system, to the one or more system time-based power limits;
generating at least one non-PU sub-system power limit budget for constraining power in a non-PU sub-system in the processor-based system from the system power limit budget; and
generating the one or more second PU sub-system power limit budgets based a difference between the system power limit budget and the at least one non-PU sub-system power limit budget.

35. A processor-based system, comprising:
a processing unit (PU) sub-system comprising one or more PUs;
a non-PU sub-system comprising one or more non-PU devices;
a PU sub-system power monitoring circuit configured to monitor PU sub-system current power consumption in the PU sub-system;
a system power monitoring circuit configured to monitor system current power consumption in the processor-based system;
one or more PU power constraining circuits each configured to constrain a PU of the one or more PUs; and
a power limiter circuit configured to:
  (a) compare the PU sub-system current power consumption indicating a first current power consumption in the PU sub-system to each of one or more PU sub-system time-based power limits;
  (b) compare the system current power consumption indicating a second current power consumption in the processor-based system to each of one or more system time-based power limits;
  (c) generate one or more first PU sub-system power limit budgets based on the comparison of the PU sub-system current power consumption in the PU sub-system, to the one or more PU sub-system time-based power limits;
  (d) generate one or more second PU sub-system power limit budgets based on the comparison of the system current power consumption in the processor-based system, to the one or more system time-based power limits;

(e) generate a total PU sub-system power limit budget based on a lower power limit budget among the one or more first PU sub-system power limit budgets and the one or more second PU sub-system power limit budgets; and
(f) constrain a power consumption in the PU sub-system to the total PU sub-system power limit budget.

* * * * *